United States Patent
Komiya

(10) Patent No.: US 10,542,334 B2
(45) Date of Patent: Jan. 21, 2020

(54) OPTICAL SWITCH MODULE AND OPTICAL RELAY APPARATUS AND PATH EXPANSION METHOD THAT USE OPTICAL SWITCH MODULE

(71) Applicant: FUJITSU LIMITED, Kawasaki-shi, Kanagawa (JP)

(72) Inventor: Shinji Komiya, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/512,950

(22) Filed: Jul. 16, 2019

(65) Prior Publication Data

US 2019/0349653 A1 Nov. 14, 2019

Related U.S. Application Data

(62) Division of application No. 15/075,724, filed on Mar. 21, 2016, now Pat. No. 10,405,073.

(30) Foreign Application Priority Data

Apr. 30, 2015 (JP) .................................. 2015-093148

(51) Int. Cl.
*H04J 14/02* (2006.01)
*H04Q 11/00* (2006.01)

(52) U.S. Cl.
CPC ...... *H04Q 11/0005* (2013.01); *H04J 14/0212* (2013.01); *H04J 14/0217* (2013.01); *H04J 14/0219* (2013.01); *H04Q 2011/0016* (2013.01); *H04Q 2011/0039* (2013.01); *H04Q 2011/0054* (2013.01)

(58) Field of Classification Search
CPC ............. H04Q 11/0005; H04J 14/0212; H04J 14/0217; H04J 14/0219
See application file for complete search history.

(56) References Cited

U.S. PATENT DOCUMENTS

| | | | |
|---|---|---|---|
| 2003/0012481 A1* | 1/2003 | Fant | G02B 6/3562 385/16 |
| 2003/0161629 A1* | 8/2003 | Frascolla | H04Q 11/0062 398/5 |
| 2013/0108215 A1* | 5/2013 | Ticknor | G02B 6/35 385/17 |

FOREIGN PATENT DOCUMENTS

JP 2012-39503 2/2012

OTHER PUBLICATIONS

Office Action dated Jun. 29, 2017 in U.S. Appl. No. 15/075,724.
(Continued)

*Primary Examiner* — Chris H Chu
(74) *Attorney, Agent, or Firm* — Staas & Halsey LLP

(57) ABSTRACT

An optical switch module includes: N first input ports to which a signal is input; M first output ports from which a signal is output; an M×N switch to include N second input ports and M second output ports, and to set a path between the second input ports and the second output ports, the second output ports coupling with the first output ports, respectively; a test-signal input port to which a test-signal is capable of being externally input; an expansion port from which one of the test-signal and the signal from any one of the first input ports is output; and an optical switch to selectively connect at least one of the test-signal and the signal from any one of the first input ports to at least one of the expansion port and any one of the second input ports, wherein both N and M are natural numbers.

2 Claims, 19 Drawing Sheets

(56) References Cited

OTHER PUBLICATIONS

Office Action dated Nov. 3, 2017 in U.S. Appl. No. 15/075,724.
Final Office Action dated May 17, 2018 in U.S. Appl. No. 15/075,724.
Advisory Action dated Jul. 27, 2018 in U.S. Appl. No. 15/075,724.
Office Action dated Sep. 21, 2018 in U.S. Appl. No. 15/075,724.
Notice of Allowance dated Apr. 17, 2019 in U.S. Appl. No. 15/075,724.
U.S. Appl. No. 15/075,724, filed Mar. 21, 2016, Shinji Komiya, Fujitsu Limited.

* cited by examiner

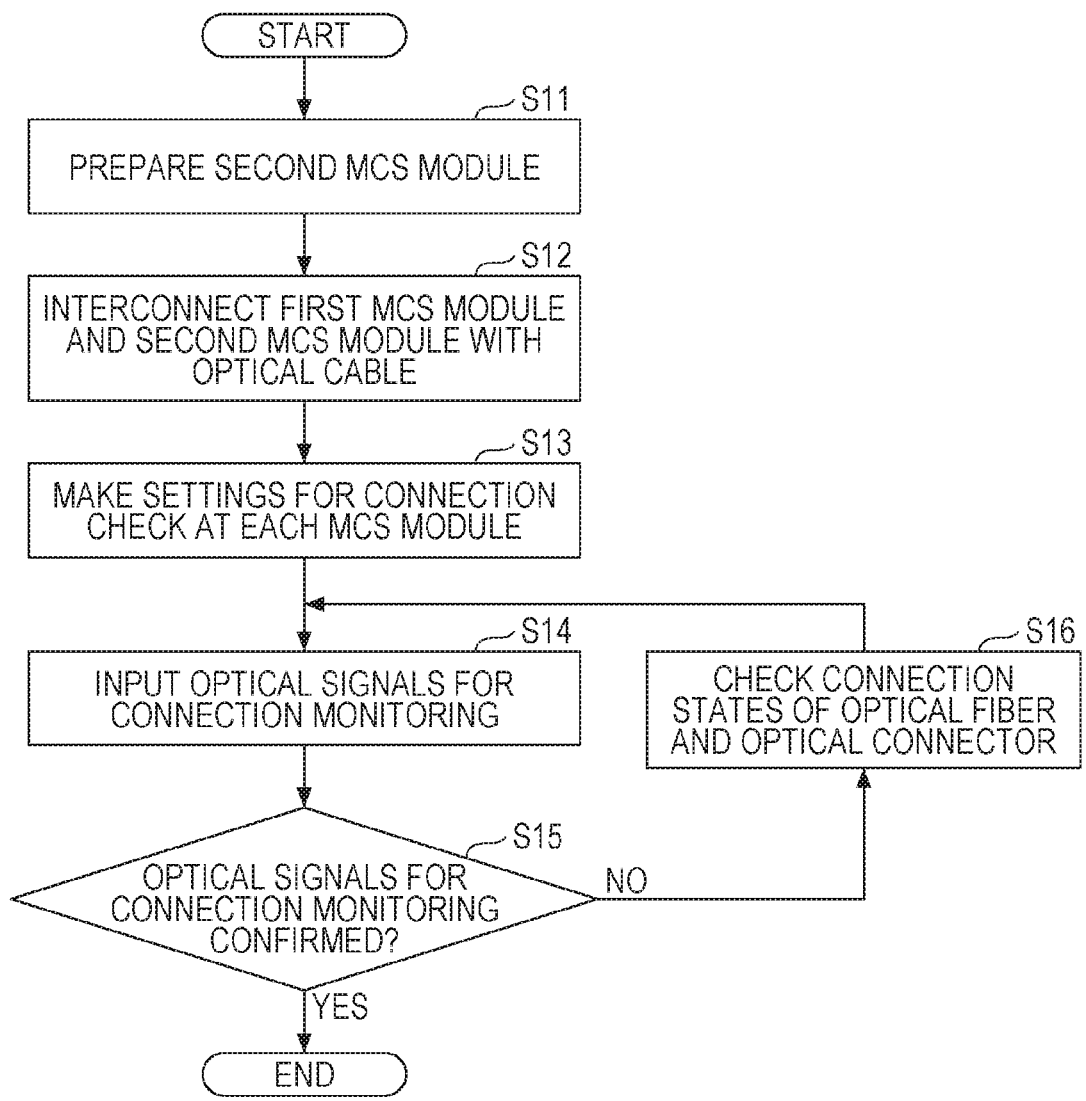

OPTICAL SWITCH MODULE AND OPTICAL RELAY APPARATUS AND PATH EXPANSION METHOD THAT USE OPTICAL SWITCH MODULE

CROSS-REFERENCE TO RELATED APPLICATION

This application is a Divisional application of prior U.S. application Ser. No. 15/075,724 filed Mar. 21, 2016 which is based upon and claims the benefit of priority of the prior Japanese Patent Application No.: 2015-093148, filed on Apr. 30, 2015, the entire contents of which are incorporated herein by reference.

FIELD

The embodiments discussed herein are related to an optical switch module and an optical relay apparatus and a path expansion method that use the optical switch module.

BACKGROUND

A reconfigurable optical add/drop multiplexer (ROADM) used in a wavelength division multiplex (WDM) system is an optical relay apparatus that has optical switches to drop and add optical signals with different wavelengths. To increase the flexibility of an optical network, implementation of Colorless, Directionless, and Contentionless (CDC) functions with which wavelengths and paths are freely set in a ROADM and wavelength contention is avoided is being studied. A ROADM having CDC functions is called a CDC-ROADM.

FIG. 1 illustrates the structure of a multicast switch (MCS) module 100 as an example of an optical switching structure that implements CDC functions. At an MCS 110-2 on the drop side, which receives WDM signals and drops optical signals, WDM signals received from M paths (deg 1 to deg M) are input to M 1×N optical couplers (represented as SPLs in FIGS. 1) $13_1$ to $13_m$ (collectively referred to below as the optical couplers 13 at appropriate points) and are then dropped in N directions. The dropped WDM signals are connected to N M×1 optical switches $11_1$ to $11_n$ (collectively referred to below as the optical switches 11 at appropriate points) and are then output from M×1 optical switches $11_1$ to $11_n$ to N drop ports.

An MCS 110-1 on the add side, which adds, to WDM signals, optical signals to be transmitted, has the same structure as the MCS 110-2; at the MCS 110-1, optical signals are input from N add parts into N 1×M optical switches $11_1$ to $11_n$. Outputs from each 1×M optical switch 11 are output to M N×1 optical couplers $13_1$ to $13_m$ and are then output to M paths. The 1×M optical switches 11 on the add side and the M×1 optical switches 11 on the drop side have the same switch structure; they differ only in that the number of inputs and the number of outputs are reversed depending on the signal transmission direction. In FIG. 1, therefore, each of these optical switches is indicated as M×1 SW on both the add side and the drop side. Similarly, the N×1 optical couplers 13 on the add side and the 1×N optical couplers 13 on the drop side have the same optical coupler structure; they differ only in that the number of inputs and the number of outputs are reversed depending on the signal transmission direction. In FIG. 1, therefore, each of these optical couplers is indicated as 1×N SPL on both the add side and the drop side. In this description, an optical switching structure having n output ports or input ports for m input ports or output ports will be referred to as M×N optical switch (including optical coupler, optical selector, optical splitter, and the like), regardless of the input and output directions.

In general, the MCS module 100 is used in such a way that the add side and drop side are paired as illustrated in FIG. 1. An MCS having N add ports or drop ports for M paths will be referred to as an M×N MCS.

FIG. 2 illustrates the node structure of a two-path ROADM 1001 in which wavelength selective switches (WSSs) 105a and 105b and 2×2 MCSs 110-1 and 110-2 are combined together. In a previous ROADM, arrayed waveguide gratings (AWGs) have been used at portions equivalent to the MCSs 110-1 and 110-2, so it has been possible to input only optical signal with a predetermined wavelength from each add port. However, the use of the MCSs 110-1 and 110-2 enables an optical signal with a desired wavelength to be input from each add port, so a Colorless function is achieved. This is also true on the drop side.

Optical output signals from two transponders 102 are input to signal input ports. Paths for these optical output signals are selected by a 2×2 MCS 110-1. Optical input signals from two paths are dropped to two transponders 102 by a 2×2 MCS 110-2. Since a path can be selected independently for each signal, a Directionless function is achieved. With a wavelength assigned to an input port, it is also possible to input a signal with the same wavelength from another input port (however, the same path is unable to be selected). That is, a Contentionless function is achieved.

For a CDC-ROADM node, there is a demand to increase the number (M) of selectable paths after an operation has been started. To meet this demand, at an MCS 210-2 on the drop side and an MCS 210-1 on the add side, each of 2×1 optical switches $12_1$ to $12_n$ (collectively referred to below as the optical switches 12 at appropriate points) are connected to one of the M×1 optical switches $11_1$ to $11_n$, as in an MCS module 200 illustrated in FIG. 3. Of the 2×1 optical ports 12, N ports not connected to the M×1 optical switches 11 are collectively connected to an upgrade port 215 to increase the number of paths (see U.S. Patent Application Publication No. 2013/0108215, for example).

SUMMARY

According to an aspect of the invention, an optical switch module includes: N first input ports to which an optical signal is input; M first output ports from which an optical signal is output; an M×N switch configured to include N second input ports and M second output ports, and to set an optical path between the N second input ports and the M second output ports, the M second output ports coupling with the M first output ports, respectively; a test signal input port to which a test signal is capable of being externally input; an expansion port from which one of the test signal and the optical signal from any one of the N first input ports is output; and an optical switch configured to selectively connect at least one of the test signal and the optical signal from any one of the N first input ports to at least one of the expansion port and any one of the N second input ports, wherein both N and M are natural numbers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 illustrates a flowchart indicating a path expansion method in an embodiment.

DESCRIPTION OF EMBODIMENTS

Figure 4:
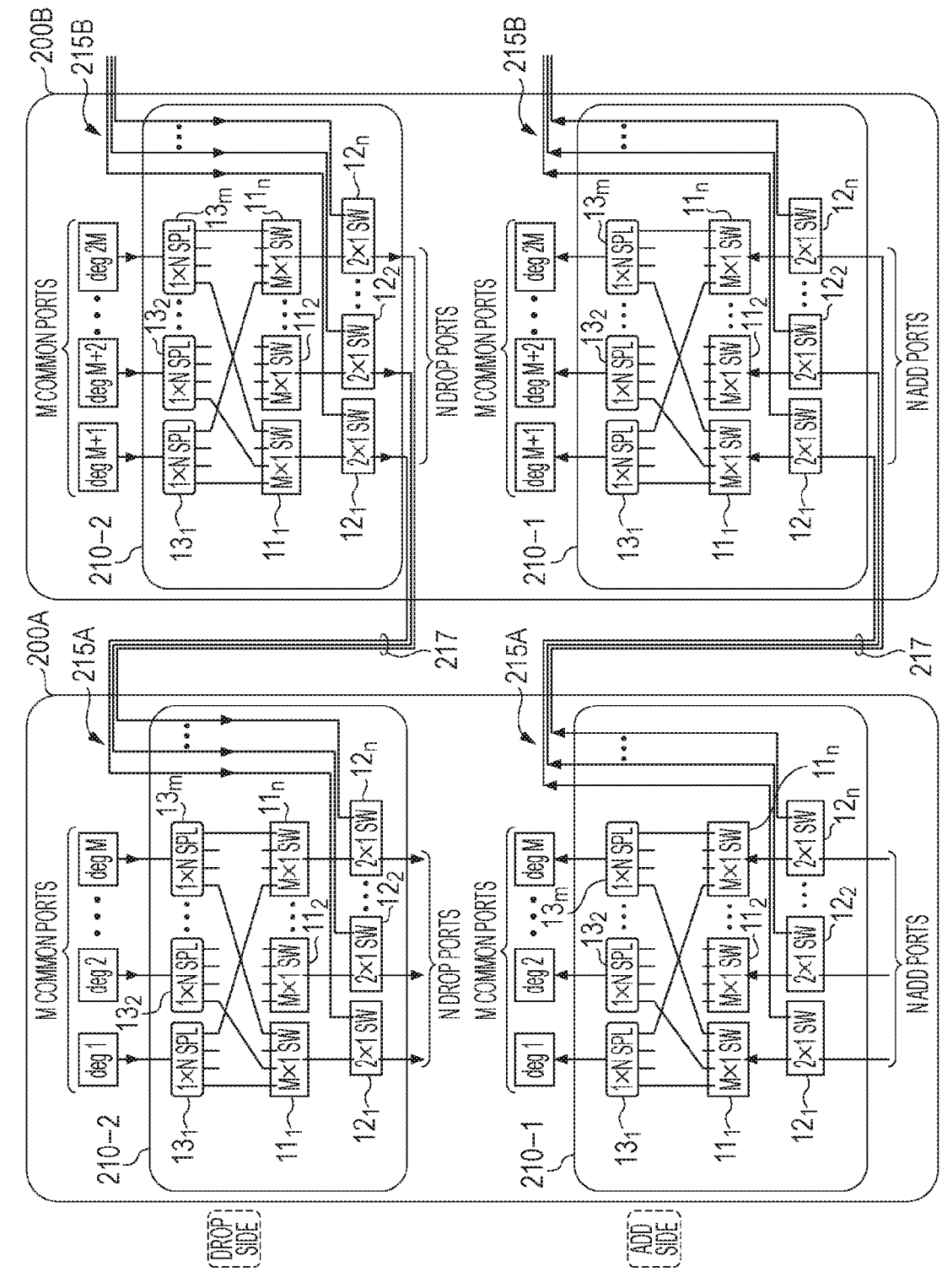
FIG. 4 illustrates a connection structure after path expansion.

FIG. 4 illustrates a structure in which an MCS module 200B, which is a second MCS module in operation, is connected to an MCS module 200A, which is a first MCS module. An upgrade port 215A on the add side of the MCS 200A is connected to add ports in the MCS 200B through an optical cable 217, and an upgrade port 215A on the drop side of the MCS 200A is similarly connected to drop ports in the MCS 200B. When optical signals are to be connected to paths of the second MCS 200B (or optical signals are to be connected from paths of the MCS 200B), signal paths can be switched toward the upgrade port 215A by switching 2×1 optical switches 12 to the MCS 200B. During path expansion, only M paths have been selectable for optical signals input from add ports. After path expansion, however, 2×M paths are selectable.

To increase paths by connecting a new MCS 200B, it is desirable to check that the MCS 200A in operation and the added MCS 200B are correctly interconnected. On the drop side, test signals can be input from an upgrade port 215B in the added MCS 200B. On the add side, however, the first MCS 200A is in operation, so it is difficult to send the test signals to the MCS 200B. If the operation of the first MCS 200A is stopped to check connections, optical signal transmission is impeded.

Before explaining embodiments of the structures of optical switch modules with which it is possible to check connections between an optical switch module in operation and an optical switch module that is added to increase paths on an optical network without affecting the optical switch module in operation and explaining an embodiment of a path expansion method, problems with possible MCS module structures will described with reference to FIGS. 5 and 6.

Figure 3:
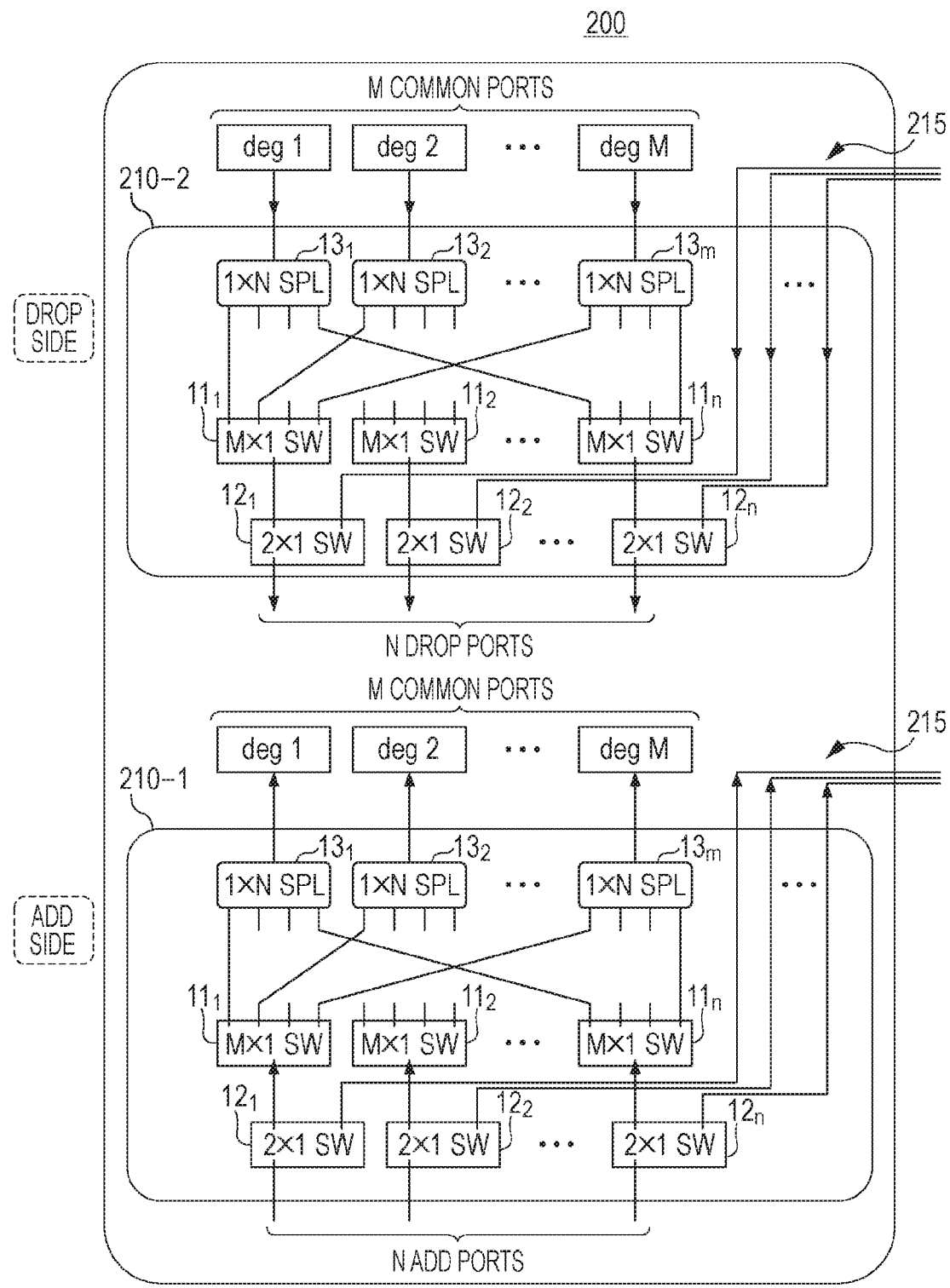
FIG. 3 illustrates an example of the structure of an MCS module with path expansion functions.
Figure 5:
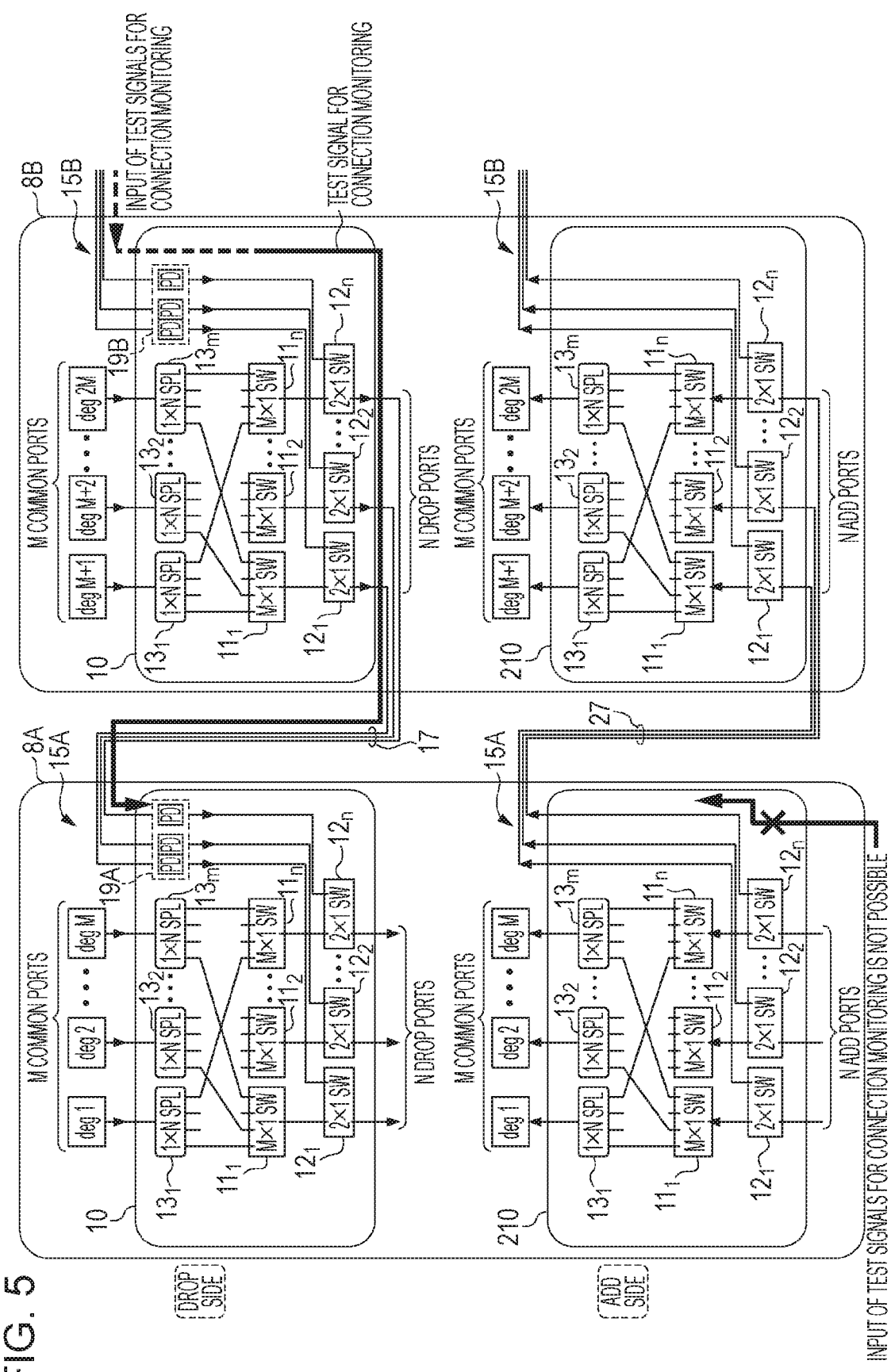
FIG. 5 illustrates a problem with a possible path expansion structure.

FIG. 5 is drawing to check connections between an MCS module 8A, which is a first MCS module in operation, and an MCB module 8B, which is a second MCS module connected to the MCS module 8A. The MCS modules 8A and 8B have the same structure and the MCS module 8B is appropriately added in response to a path expansion request. Therefore, the following description will focus on the MCS module 8A. The MCS module 8A has an MCS 10 on the drop side and an MCS 210 on the add side. The MCS 210 on the add side is the same as the MCS 210 in FIGS. 3 and 4. The MCS 10 on the drop side has a test access port (TAP) circuit 19A between an upgrade port 15A and unused 2×1 optical switches 12. The TAP circuit 19A has n monitor photodetectors (PDs).

The upgrade port 15A on the add side of the MCS module 8A is connected to the add ports of the second MCS module 8B through an optical cable 27; the upgrade port 15A on the drop side is connected to the drop ports of the MCS module 8B through an optical cable 17. The optical cables 17 and 27 are each, for example, an optical fiber connector with optical connectors. If a connection is disconnected due to a broken optical fiber or a connection is made to an incorrect port due to, for example, an incorrect connection of an optical connector, no optical signal is transmitted between the MCS module 8A and the MCS module 8B. Alternatively, an optical signal is sent to an incorrect path.

On the drop side, test signals for connection monitoring are received from the upgrade port 15B of the second MCS module 8B to monitor the test signals at the TAP circuit 19A in the first MCS module 8A. Even if the first MCS module 8A is in operation, connections to the second MCS module 8B can be checked.

On the add side, however, the first MCS module 8A is in operation, so it is difficult to input the test signals to the MCS 210 on the add side. To check connections on the add side, if the output ports of the 2×1 optical switches 12 are switched to the upgrade port 15A to input the test signals to the MCS 210 on the add side, optical transmission is suspended while the switching is in progress.

Figure 6:
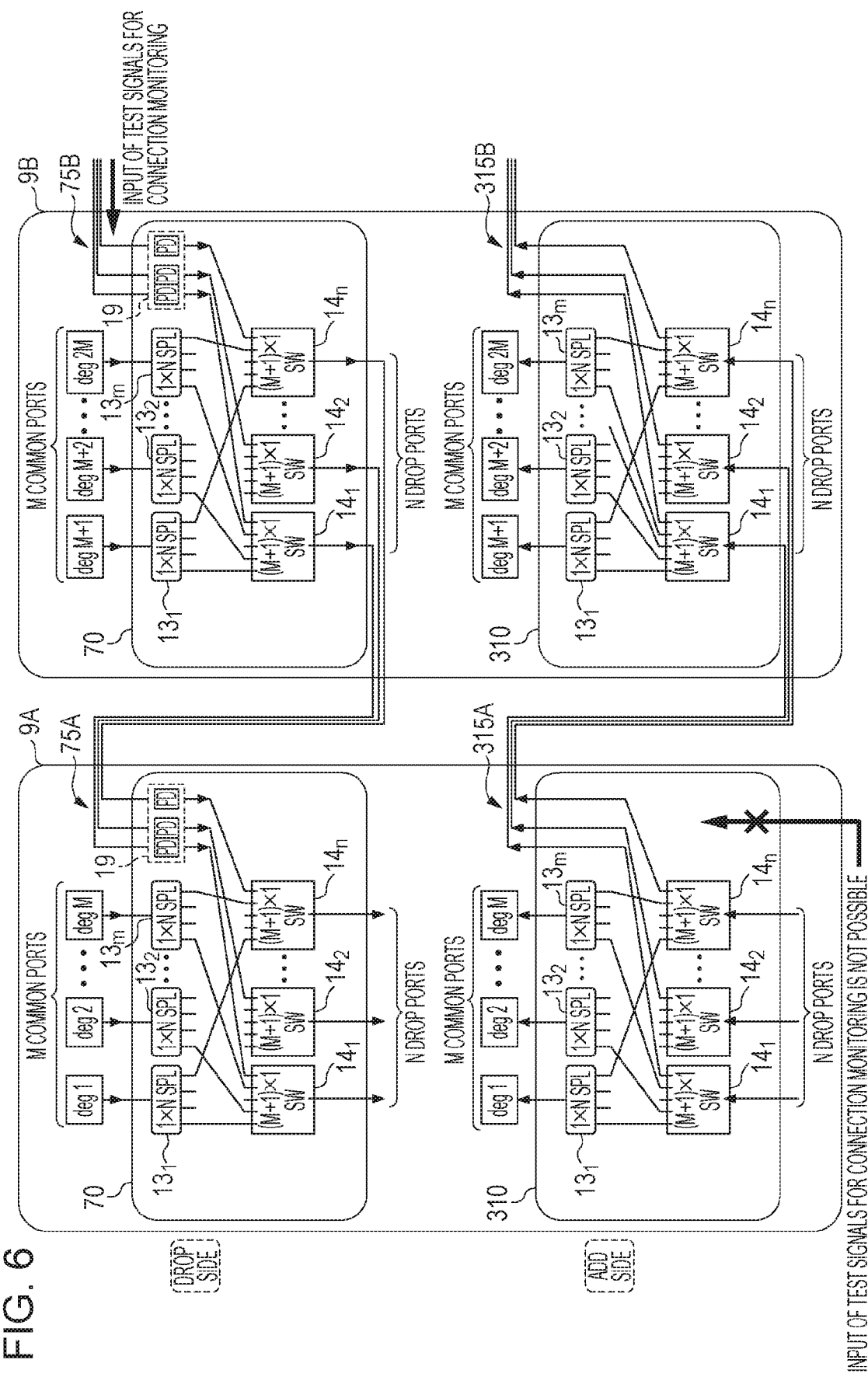
FIG. 6 illustrates a problem with another possible path expansion structure.

A similar problem arises in the structure in FIG. 6 as well. To increase paths, MCS modules 9A and 9B in FIG. 6 use n (M+1)×1 optical switches 14 instead of using n M×1 optical switches 11 and n 2×1 optical switches 12. The MCS modules 9A and 9B have the same structure. Therefore, the following description will focus on the MCS module 9A. The MCS module 9A has an MCS 70 on the drop side and an MCS 310 on the add side. In the MCS 70, an M+1st port of each optical switch 14 is connected to an upgrade port 75A and a TAP circuit 19 is inserted between the upgrade port 75A and the M+1st port of each optical switch 14. When test signals for connection monitoring are input from an upgrade port 75B of the second MCS module 9B, connections between the MCS module 9A and the MCS module 9B can be checked on the drop side. Since the optical switches $14_1$ to $14_n$ on the add side are in operation, however, it is difficult to receive the test signals on the add side.

In view of this situation, embodiments below will describe specific examples of an MCS module with path expansion functions that, even if a first MCS module is in operation, is capable of checking connections without affecting the operation. In the description and drawings, like elements will be denoted by like reference characters, and repeated descriptions will be omitted.

First Embodiment

Figure 7:
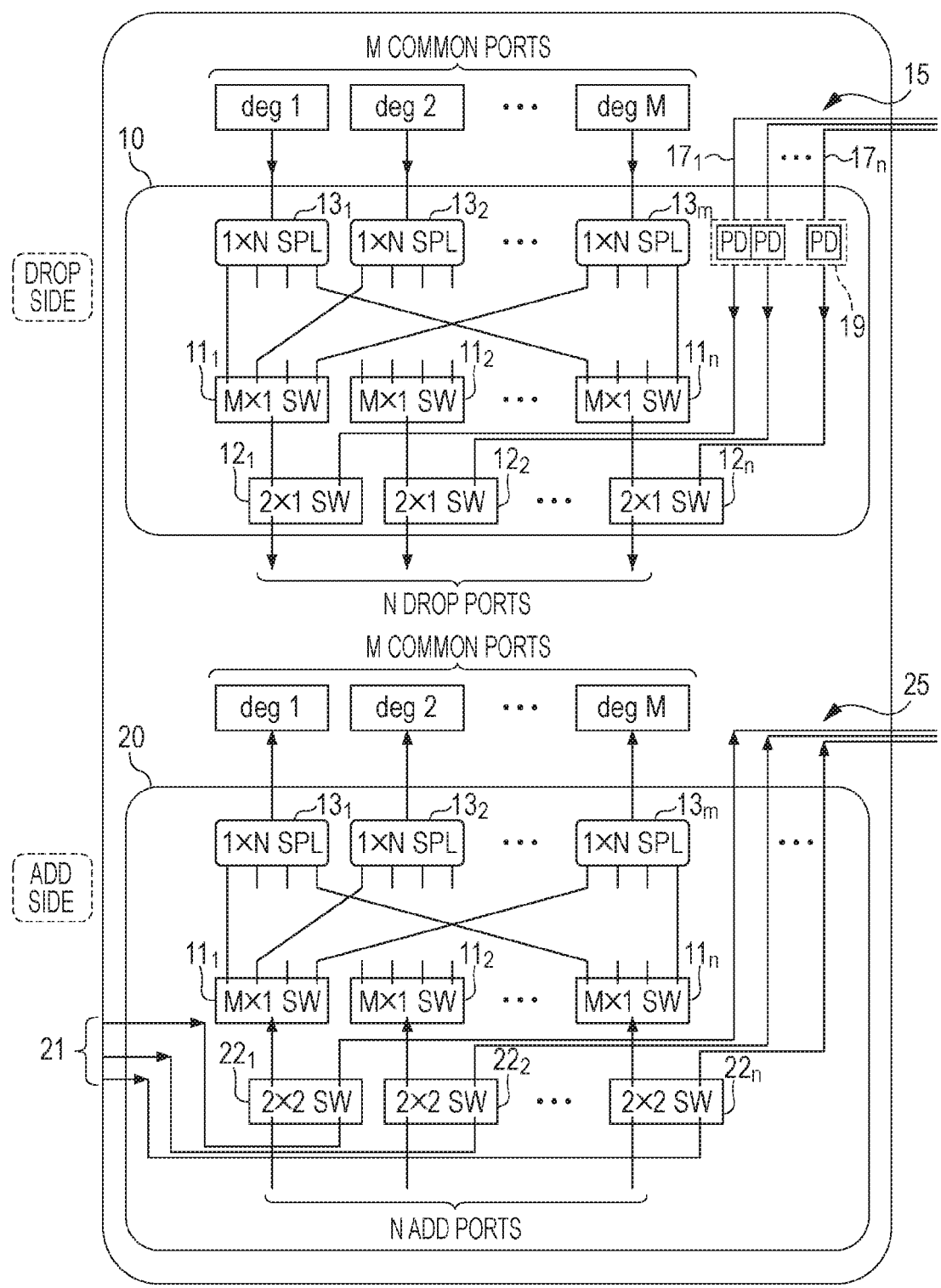
FIG. 7 illustrates a path expansion structure in which MCS modules in a first embodiment are used.

FIG. 7 schematically illustrates an MCS module 1 in a first embodiment. In the first embodiment, 2×2 optical switches 22 are used on the add side so that connections between an MCS module in operation and an additional MCS module can be checked during path expansion.

The MCS module 1 has an MCS 20 on the add side and an MCS 10 on the drop side. The MCS 20 and MCS 10 may be structured by interconnecting optical switches and couplers through fibers. Alternatively, they may be of a planar light wave circuit (PLC) type in which they are structured by using waveguides made of quartz, silicon, or another semiconductor material.

The MCS 20 on the add side has n 2×2 optical switches $22_1$ to $22_n$ (collectively referred to below as the 2×2 optical switches 22 at appropriate points), which are disposed in correspondence to n add ports, n M×1 optical switches 11, m 1×N optical couplers 13, a first upgrade port 21, and a second upgrade port 25. An M×N switch that interconnects m paths and n ports in a selectable manner is structured by using n M×1 optical switches 11 and m 1×N optical couplers 13.

One input port of each 2×2 optical switch 22 is connected to the corresponding add port, and the other input port is connected to the first upgrade port 21. One output port of the 2×2 optical switch 22 is connected to the corresponding M×1 optical switch 11, and the other output port is connected to the second upgrade port 25. Both the first upgrade port 21 and the second upgrade port 25 are formed by combining a plurality of ports. Test signals for connection monitoring are input to the first upgrade port 21 as described later. In this sense, the first upgrade port 21 may be referred to as the test signal input port 21. The second upgrade port 25 passes the test signals through new paths to check connections and increases paths. In this sense, the second upgrade port 25 may be referred to as the expansion port 25.

Figure 8A:
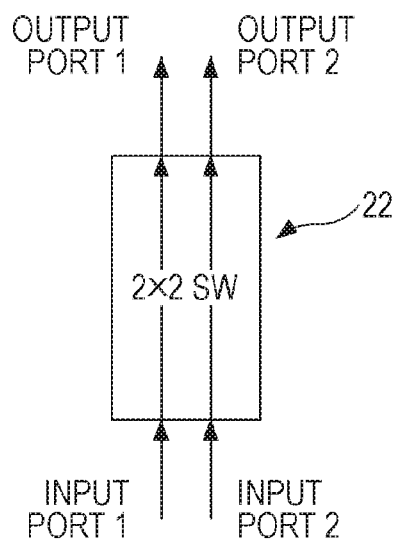
FIGS. 8A and 8B illustrate the states of 2×2 optical switches used in the structure in FIG. 7.
Figure 8B:
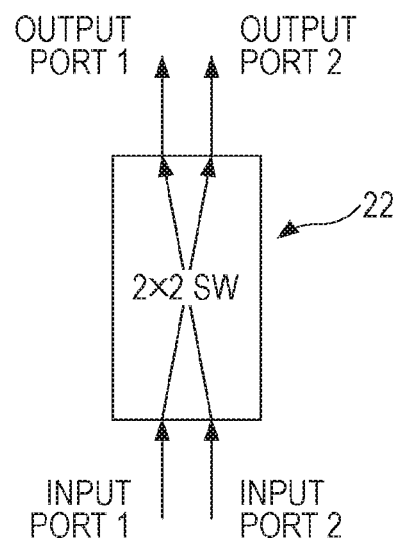

FIGS. 8A and 8B illustrate the states of the 2×2 optical switch 22 used in the MCS 20. The 2×2 optical switch 22 is an optical switch of crossbar type. In a straight state in FIG. 8A, an input port 1 is connected to an output port 1 and an input port 2 is connected to an output port 2. In a cross state in FIG. 8B, the input port 1 is connected to the output port 2 and the input port 2 is connected to the output port 1. During path expansion, the 2×2 optical switch 22 is in the straight state, so an optical signal from the corresponding add port is input to the input port 1 and is output from the output port 1. The input port 2 and output port 2 are not used.

In a case as well in which connections are checked during path expansion, the 2×2 optical switch 22 is in the straight state. An optical signal is input from the corresponding add port to the input port 1 and is output from the output port 1 to the corresponding M×1 optical switch 11. A test signal for connection monitoring is input from the first upgrade port 21 and is then input to the input port 2 of the 2×2 optical switch 22. The test signal is sent from the output port 2 through the second upgrade port 25 to the additionally connected MCS module. When connections have been checked and optical signals are sent to the added paths, the 2×2 optical switches 22 are switched to the cross state. The states of the 2×2 optical switches 22 during connection check and after path expansion will be described later in detail.

The MCS 10 on the drop side in the MCS module 1 is the same as the MCS 10 in the MCS modules 8A and 8B in FIG. 5. Therefore, it is possible to detect test signals input from the upgrade port 15 in the additionally connected MCS module at the TAP circuit 19 in the MCS module 1 in operation and conform connections.

Figure 9:
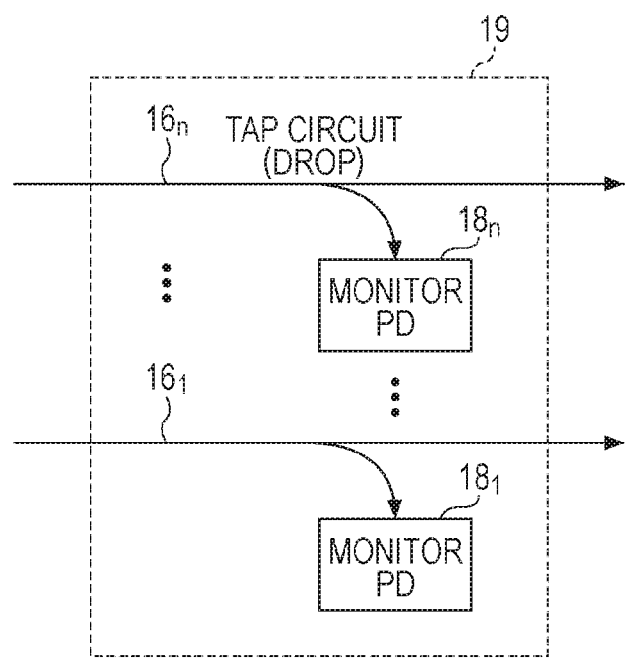
FIG. 9 illustrates an example of the structure of a drop circuit used for optical connection check.

FIG. 9 illustrates an example of the structure of the TAP circuit 19 used in the MCS 10 on the drop side. The TAP circuit 19 has n monitor PDs $18_1$ to $18_n$ (collectively referred to below as the monitor PDs 18 at appropriate points), which are disposed in a one-to-one correspondence to n optical fibers $16_1$ to $16_n$ (collectively referred to below as the optical fibers 16 at appropriate points), which extend from the upgrade port 15. Each monitor PD 18 monitors an optical component dropped from the corresponding optical fiber 16 and outputs a current according to the intensity of the test signal. If the intensity of the test signal detected by the monitor PD 18 is equal to or greater than a certain level, it can be decided that a connection to the MCS module used for path expansion has been established.

Figure 10:
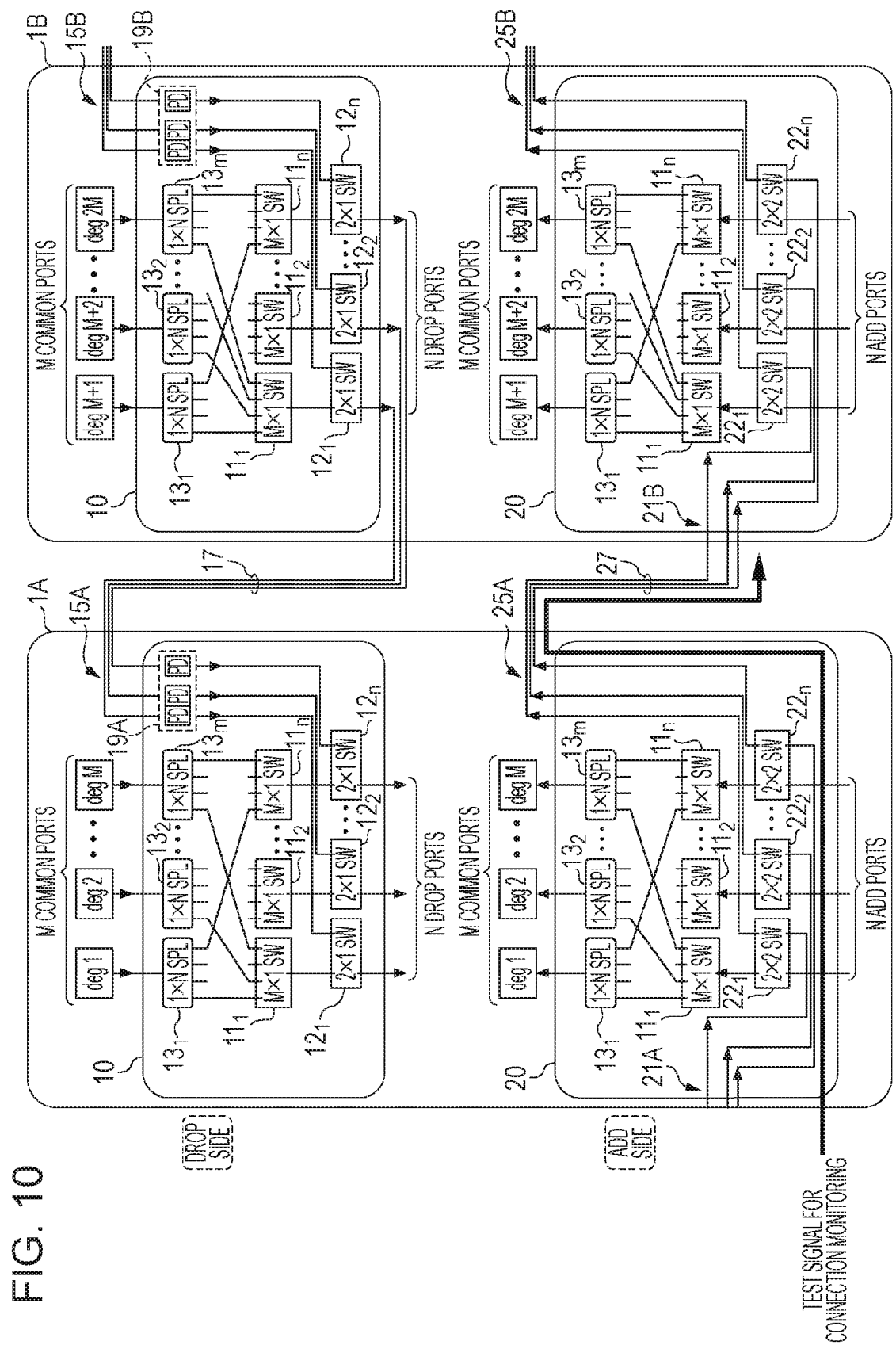
FIG. 10 illustrates connection check when the add side is operated.

FIG. 10 illustrates connection check when the second MCS module 1B has been connected to the first MCS module 1A. At the time of connection check, each 2×2 optical switch 22 in the MCS 20 is in the straight state (see FIG. 8A). An optical signal is input from the corresponding add port to the first input port of the 2×2 optical switch 22, is output from the first output port to the corresponding M×1 optical switch 11, and is transmitted to any one of M paths.

A test signal for connection monitoring is input from a first upgrade port 21A on the add side to the second input port of the 2×2 optical switch 22. The test signal is connected from the second output port to a second upgrade port 25A on the add side, after which the test signal is led to a first upgrade port 21B on the add side in the second MCS module 1B through the optical cable 27. The 2×2 optical switch 22 in the MCS module 1B is also in the straight state, so the test signal is monitored at a second upgrade port 25B. By observing whether the test signal input from the first upgrade port 21A on the add side in the first MCS module 1A has been output to the second upgrade port 25B on the add side in the second MCS module 1B, a connection between the MCS module 1A and the MCS module 1B can be checked. Since n optical fibers in the first upgrade port 21A and first upgrade port 21B on the add side are connected to the corresponding 2×2 optical switches 22, all n test signals can be checked at the second upgrade port 25B on the add side in the second MCS module 1B.

Although, in FIG. 10, the upgrade ports 15A, 15B, 25A, and 25B are schematically drawn with a plurality of lines, each of these ports may be a plurality of ports connected to the optical cable 17 or 27 through optical connectors (not illustrated).

Figure 1:
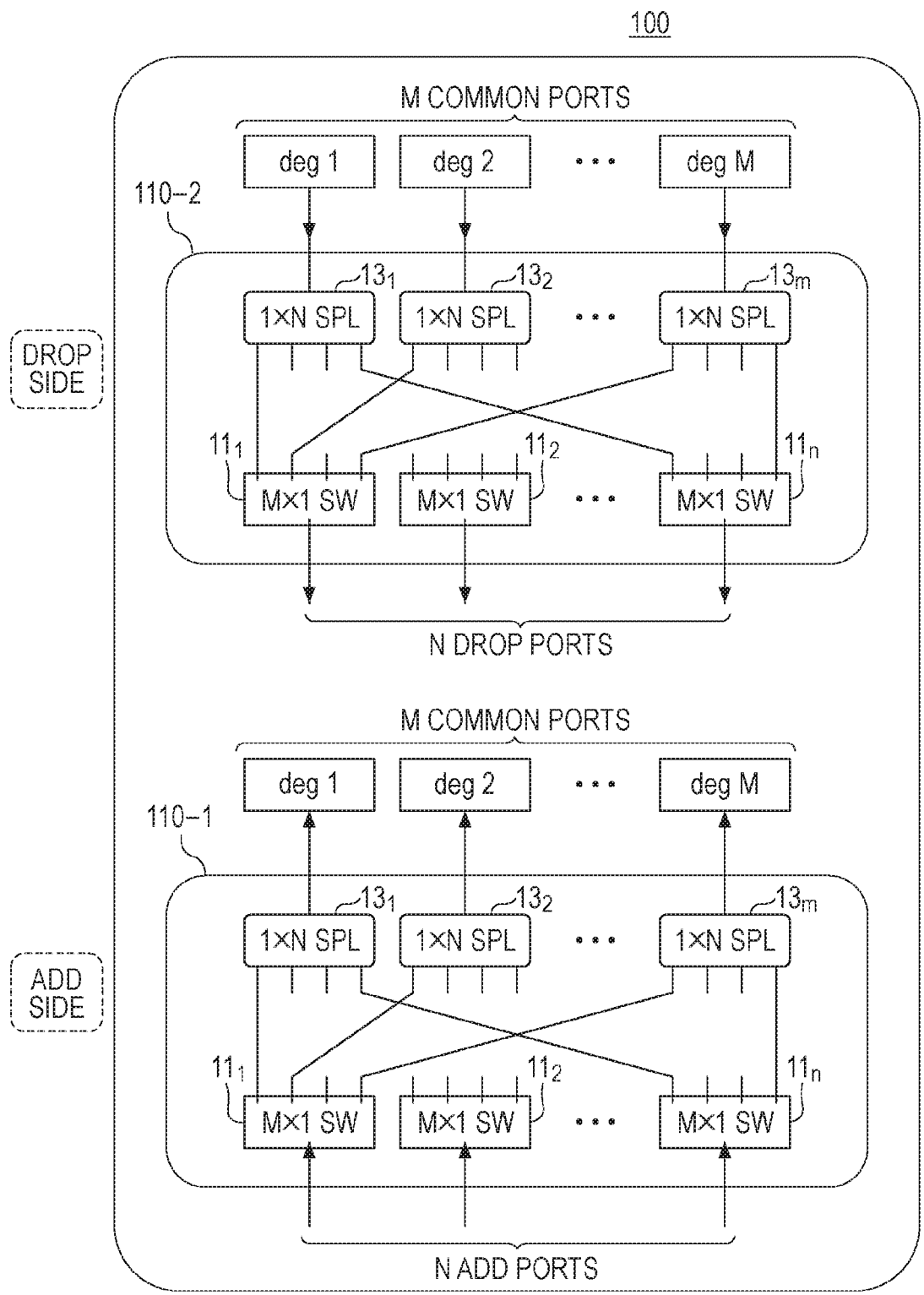
FIG. 1 illustrates the structure of an ordinary MCS module.
Figure 2:
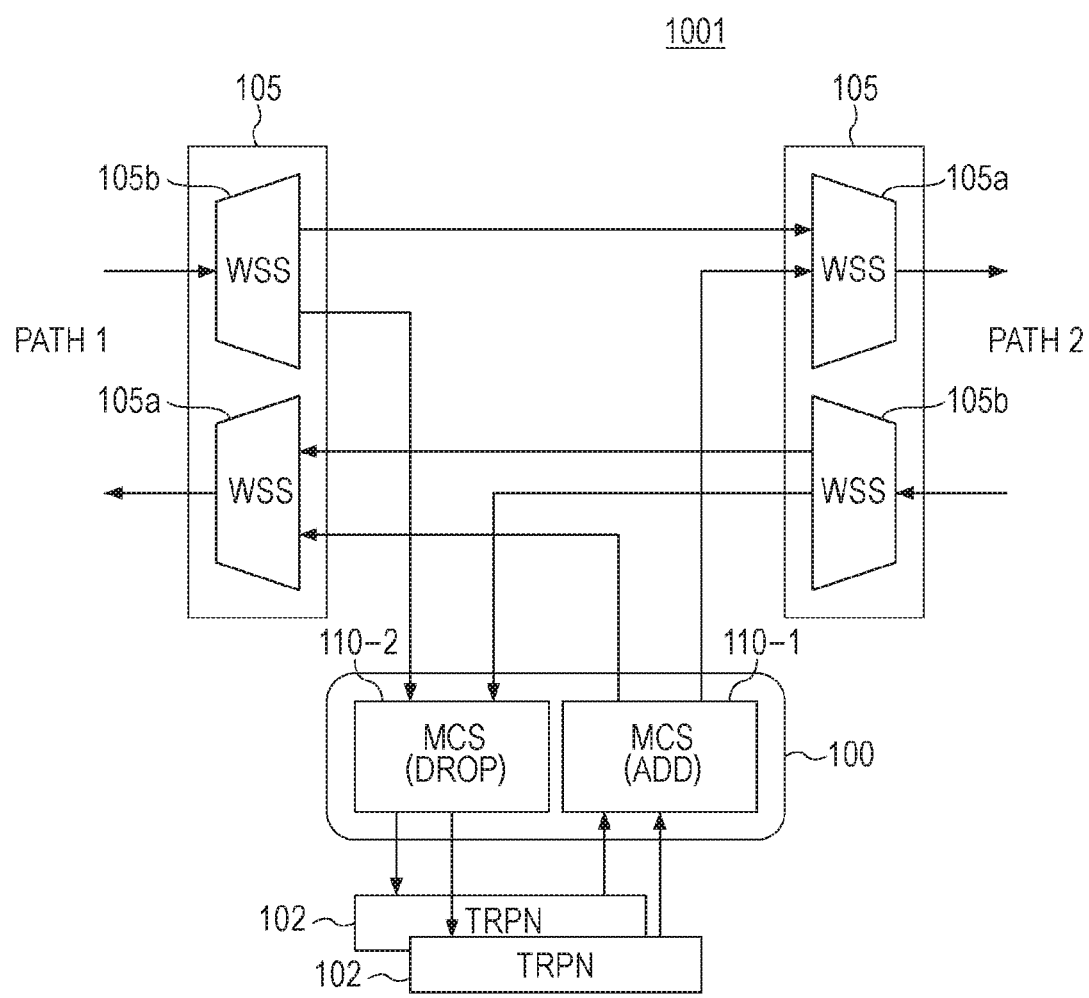
FIG. 2 illustrates an example of the structure of a ROADM in which MCS modules are used.
Figure 11:
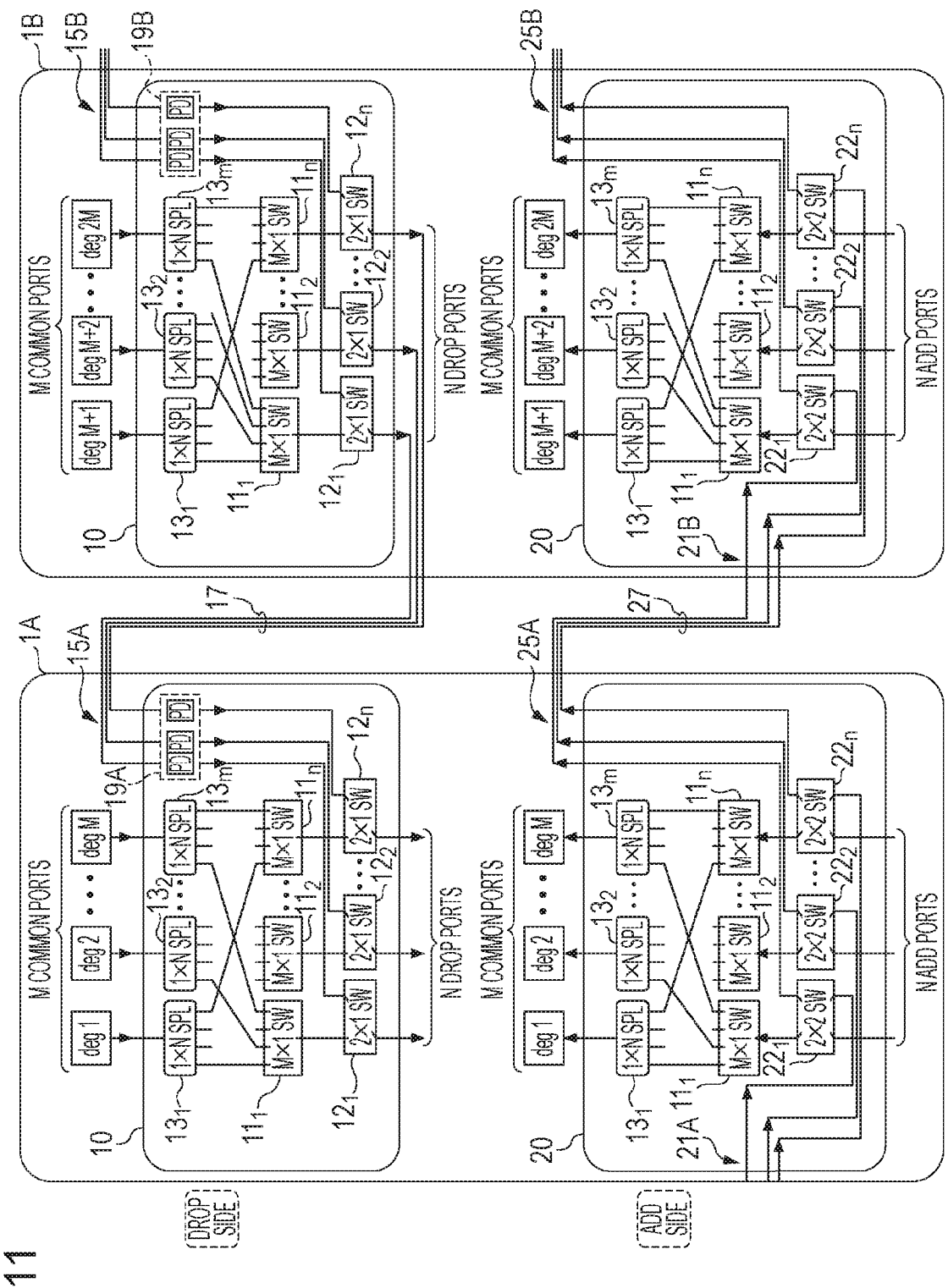
FIG. 11 illustrates connections to added paths.

FIG. 11 illustrates signal transmission to paths that have been added after their connections had been confirmed. When an optical signal is transmitted to an added path, the corresponding 2×2 optical switches 22 in both the MCS module 1A and MCS module 1B are switched to the cross state. An optical signal from a transponder 102 (see FIG. 2) is input from one add port in the MCS module 1A to the first input port of the corresponding 2×2 optical switch 22, after which the optical signal is led from the second output port, which is diagonally opposite to the first input port, to the upgrade port 25A. The optical signal is input to the first upgrade port 21B in the MCS 20 in the second MCS module 1B through the optical cable 27, after which the optical signal is input to the corresponding M×1 optical switch 11 by the corresponding 2×2 optical switch 22 in the cross state and is sent to any one of an M+1st path to a 2×Mth path.

When, on the drop side, an optical signal is to be supplied from an added path to a transponder 102, the corresponding 2×1 optical switch 12 in the first MCS 10 is switched to the upgrade port 15A and the corresponding 2×1 optical switch 12 in the second MCS 10 is connected to the corresponding M×1 optical switch 11. Thus, an optical signal that has been sent from any one of the M+1st path to the 2×Mth path is received at the transponder 102.

When the MCS module 1B is added to the MCS module 1A for path expansion as described above, even if the first MCS module 1A is in operation, connections of optical paths between the MCS modules 1A and 1B can be checked without affection the operation. After the connections have been checked, an optical signal can be sent to a desired path in a state in which there is no problem such as an incorrect connection or a broken fiber.

Second Embodiment

Figure 12:
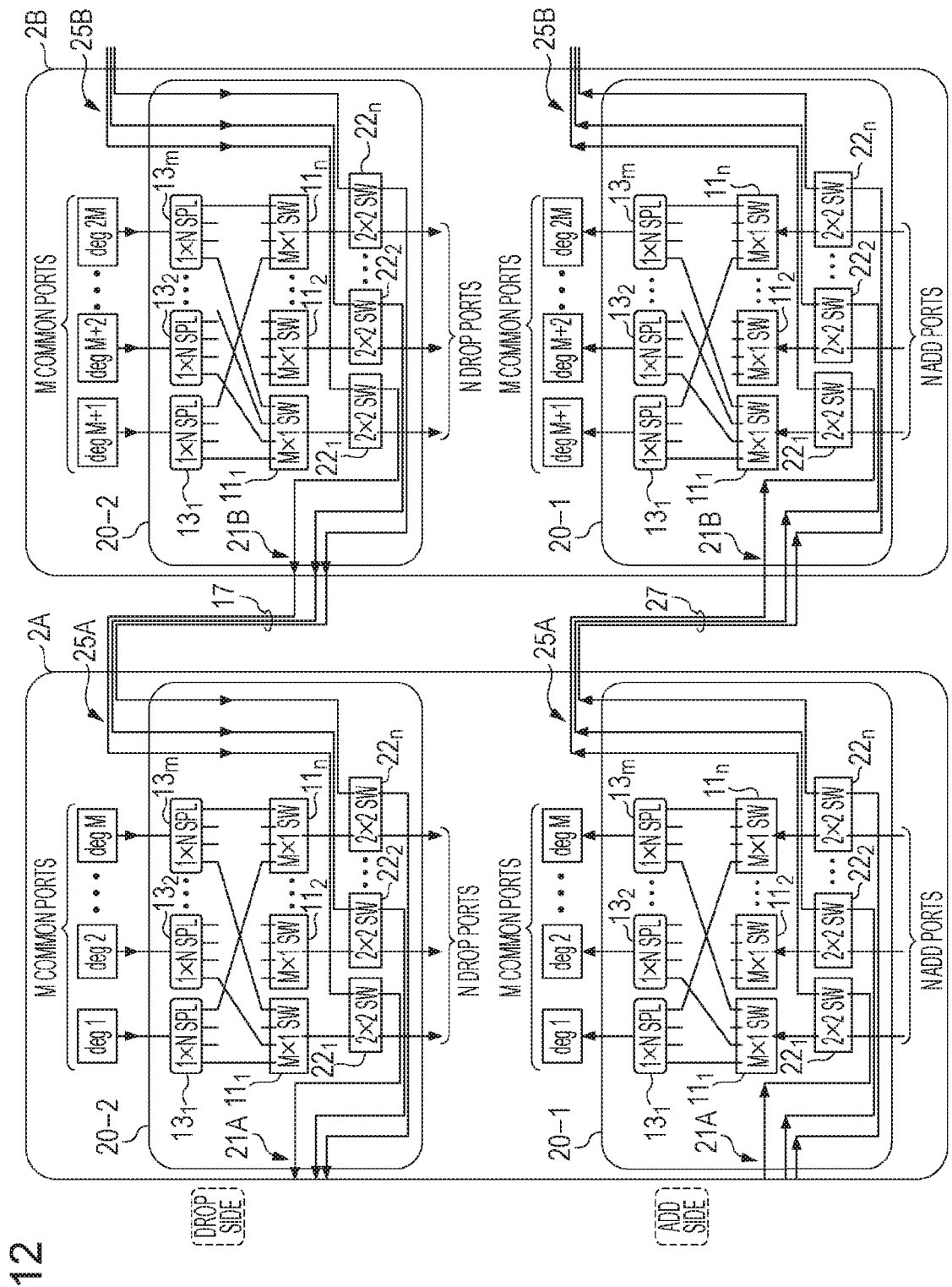
FIG. 12 illustrates a path expansion structure in which MCS modules in a second embodiment are used.

FIG. 12 illustrates a path expansion structure in which MCS modules in a second embodiment are used. An MCS module 2A is a module in operation and an MCS module 2B is an additionally connected module. In the second embodiment, 2×2 optical switches 22 of crossbar type are used on the drop side as well. In this structure, the drop side can lack a TAP circuit.

The MCS modules 2A and 2B have the same structure. Therefore, the following description will focus on the MCS module 2A. The MCS module 2A has an MCS 20-1 on the add side and an MCS 20-2 on the drop side. The MCSs 20-1 and 20-2 have the same structure.

When connections are checked during path expansion, test signals are input from the second upgrade port 25B in the MCS-20-2 in the second MCS module 2B. During connection check, the 2×2 optical switches 22 in both the MCS modules 2A and 2B are in the straight state. The input test signals are further input from the first upgrade port 21B in the MCS 20-2 in the MCS module 2B to the second upgrade port 25A in the MCS 20-2 in the MCS module 2A through the optical cable 17. The input test signals are output to the first upgrade port 21A in the MCS 20-2 by the 2×2 optical switches 22 and are monitored. This connection check can be performed without affecting the operation of the first MCS module 2A. The structure and connection check on the add side are the same as in the first embodiment.

When optical signals are sent to an M+1st path to a 2×Mth path after connection check, the 2×2 optical switches 22 in both the MCS 20-1 in the MCS module 2A and the MCS 20-1 in the MCS module 2B are switched to the cross state. When optical signals are received from the M+1st path to the 2×Mth path on the drop side, the 2×2 optical switches 22 in both the MCS 20-2 in the MCS module 2A and the MCS 20-2 in the MCS module 2B are similarly switched to the cross state.

In this structure, it is possible to check connections of the additionally connected MCS module 2B while the first MCS module 2A is in operation. After the connections have been confirmed, optical signals can be transmitted and received to and from added paths. In the structure in FIG. 12, the add side and drop side can have the same structure in each MCS module 2, so manufacturing is simplified. If MCSs 20-1 and 20-2 of PLC type are used, cutouts of PLCs manufactured on the same wafer can be used.

Figure 13:
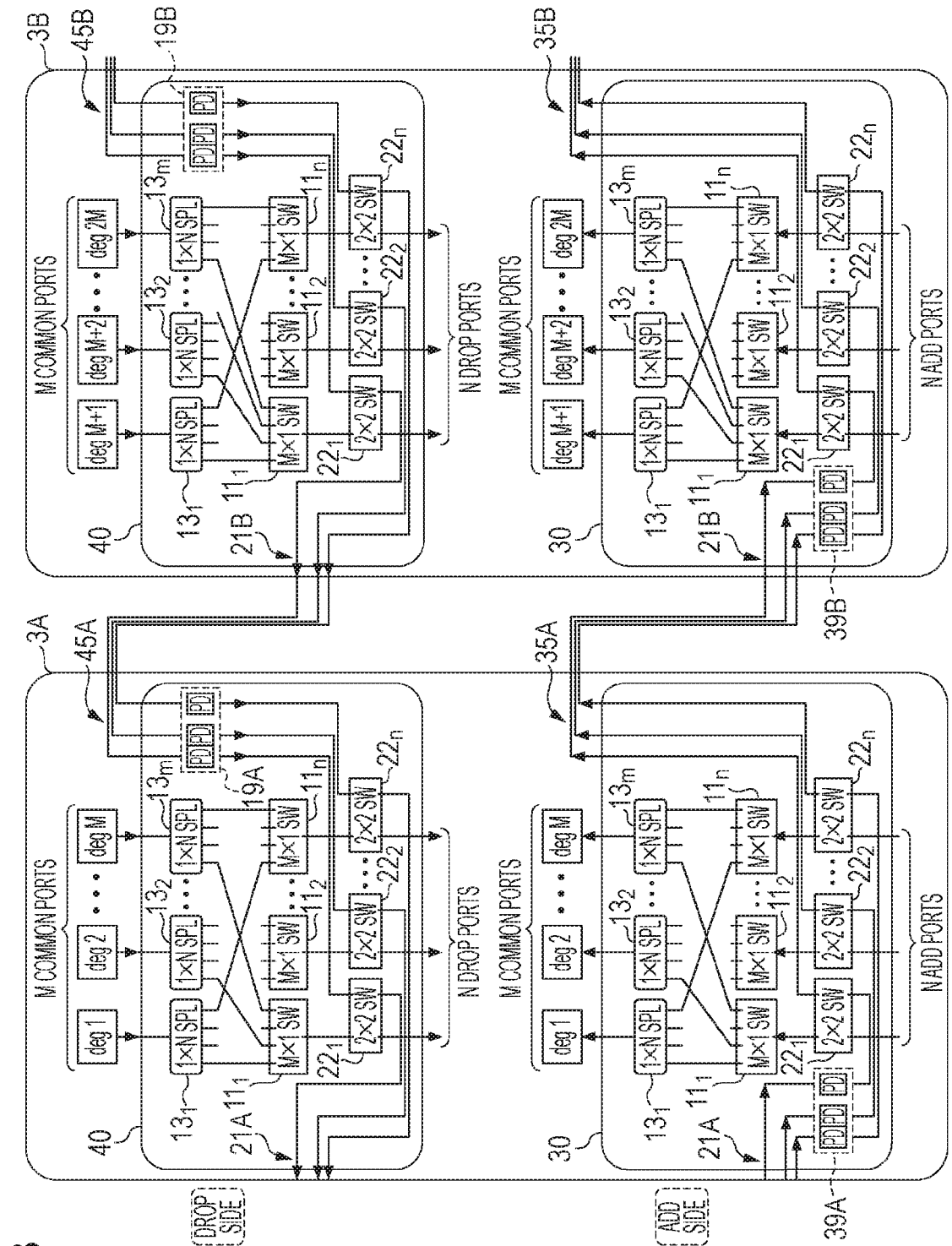
FIG. 13 illustrates a modification of the second embodiment.

FIG. 13 illustrates a modification of the second embodiment. In FIG. 13, a TAP circuit is placed on at least one of the add side and drop side for connection check, besides the structure in FIG. 12. MCS modules 3A and 3B have the same structure. Therefore, the following description will focus on the MCS module 3A.

The MCS module 3A has an MCS 30 on the add side and an MCS 40 on the drop side. In the MCS 30, a TAP circuit 39A is placed between the first upgrade port 21A and n 2×2 optical switches 22. In the MCS 40, the TAP circuit 19A is placed between a second upgrade port 45A and n 2×2 optical switches 22.

On the drop side, test signals are input from an upgrade port 45B in the second MCS module 3B and are then monitored at the TAP circuit 19A on the drop side in the first MCS module 3A. On the add side, test signals are input from the upgrade port 21A in the first MCS module 3A and are then monitored at a TAP circuit 39B on the add side in the second MCS module 3B.

This structure enables the MCS modules themselves on an external add side and drop side to have optical signal monitoring functions for connection check. Theoretically, even in a structure in which the TAP circuit 39B is placed only in the MCS 30 in the second MCS module 3B on the add side and the TAP circuit 19A is placed only in the MCS 40 in the first MCS module 3A on the drop side, connections can be checked. From the viewpoint of achieving path expansion and connection check only by connecting the MCS modules 3A and 3B having the same structure, however, a convenient way for path expansion is to use MCS modules of the same type in which a TAP circuit is placed on both the add site and the drop side.

Third Embodiment

Figure 14:
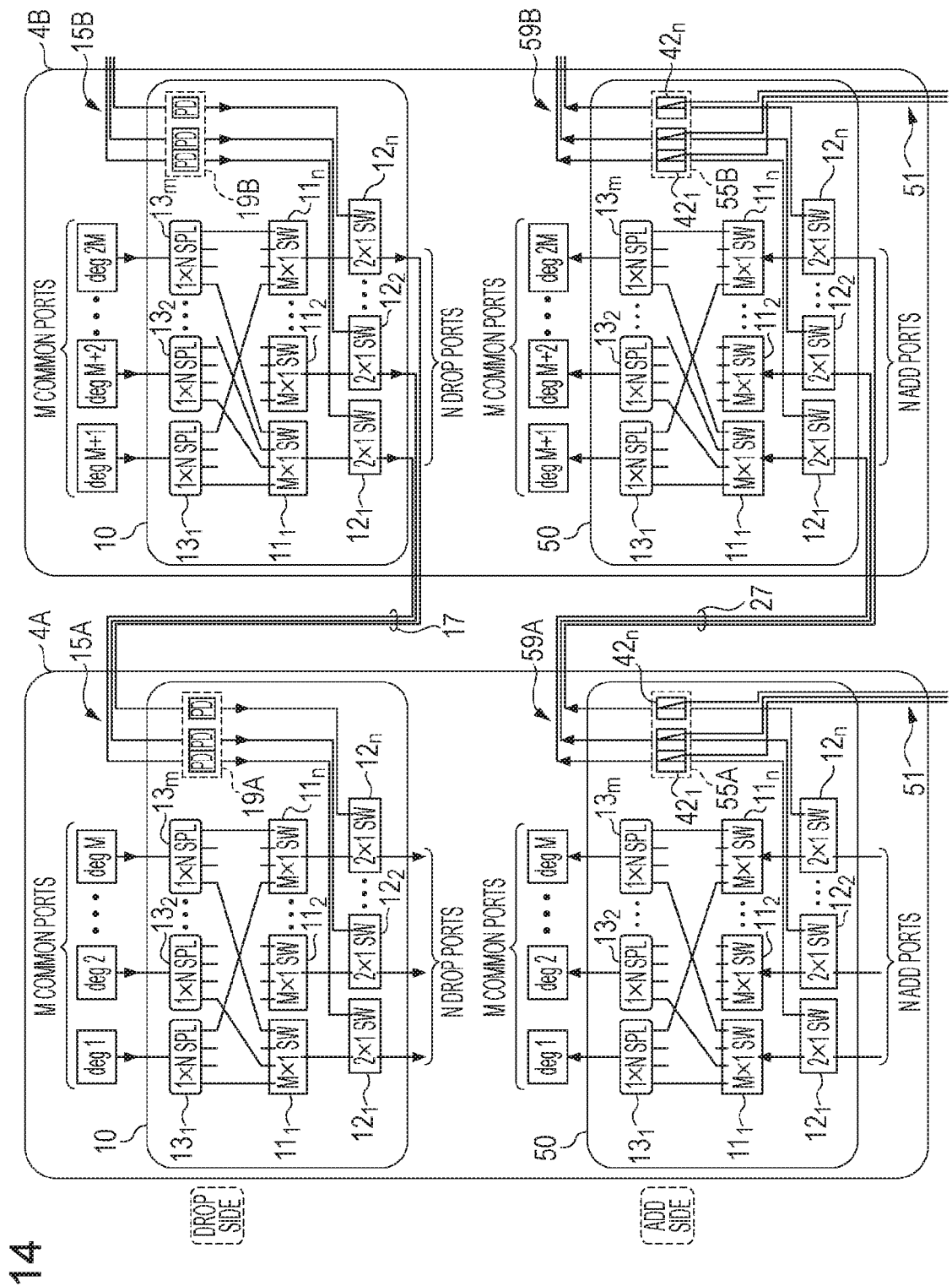
FIG. 14 illustrates a path expansion structure in which MCS modules in a third embodiment are used.

FIG. 14 illustrates a path expansion structure in which MCS modules in a third embodiment are used. In the third embodiment, 2×1 optical switches $42_1$ to $42_n$ (collectively referred to below as the 2×1 optical switches 42 at appropriate points) and a verify port 51 are used on the add side to check connections. An MCS module 4A is a module in operation and an MCS module 4B is an additionally connected module. In the example in FIG. 14, the MCS modules 4A and 4B have the same structure. Therefore, the following description will focus on the MCS module 4A.

The MCS module 4A has an MCS 50 on the add side and the MCS 10 on the drop side. The MCS 10 is the same as the MCS 10 in FIG. 7 (first embodiment). That is, paths are added by using 2×1 optical switches 12 and the upgrade port 15A, and connections are checked by using the TAP circuit 19A.

The MCS 50 has n 2×1 optical switches 12, n M×1 optical switches 11, m 1×N optical couplers 13, a TAP circuit 55A, and the verify port 51 used to input test signals. The verify port 51 may be referred to as the test signal input port 51. One output port of each 2×1 optical switch 12 is connected to the corresponding M×1 optical switch 11, and a normal add operation is performed.

The TAP circuit 55A has n 2×1 optical switches 42. Each 2×1 optical switch 42 has two input ports, one of which is used for a connection to the corresponding 2×1 optical switch 12 and the other of which is used for a connection to the verify port 51.

When paths are to be added while the MCS module 4A, which is a first MCS module, is in operation, the MCS module 4B, which is a second MCS module, is connected with the optical cable 17 and optical cable 27. On the add side, an upgrade port 59A in the MCS module 4A is connected to add ports in the MCS module 4B. To check connections, the input ports of the 2×1 optical switches 42 of the TAP circuit 55A in the MCS module 4A are connected to the verify port 51, and test signals (optical signals) for connection monitoring are input from the verify port 51. These test signals are led to the second MCS module 4B through the optical cable 27.

In the second MCS module 4B, the 2×1 optical switches 12 used for path selection are set so that input test signals are connected to the upgrade port 59B. The input port setting of each 2×1 optical switch 42 in a TAP circuit 55B is switched to the corresponding 2×1 optical switch 12. When it is confirmed that test signals are output from the upgrade port 59B, it is confirmed that optical paths on the add side have been connected between the first MCS module 4A and the second MCS module 4B. Upon the completion of the connection confirmation, the input port setting of each 2×1 optical switch 42 in the TAP circuit 55A in the first MCS module 4A is switched back from the verify port 51 to the corresponding 2×1 optical switch 12.

On the drop side, the upgrade port 15 in the MCS module 4A is connected to the drop ports of the MCS module 4B. When connections are to be checked, test signals are input from the upgrade port 15B in the second MCS module 4B and the test signals are monitored at the TAP circuit 19A in the first MCS module 4A, as in the first embodiment.

Theoretically, the MCS 50 in the second MCS module 4B can lack the TAP circuit 55B and verify port 51; instead, the MCS 210 in FIG. 5 may be used. From the viewpoint of achieving path expansion and connection check only by connecting MCS modules having the same structure, however, it is desirable to manufacture the MCS modules 4A and 4B having the same structure and use them.

Figure 15:
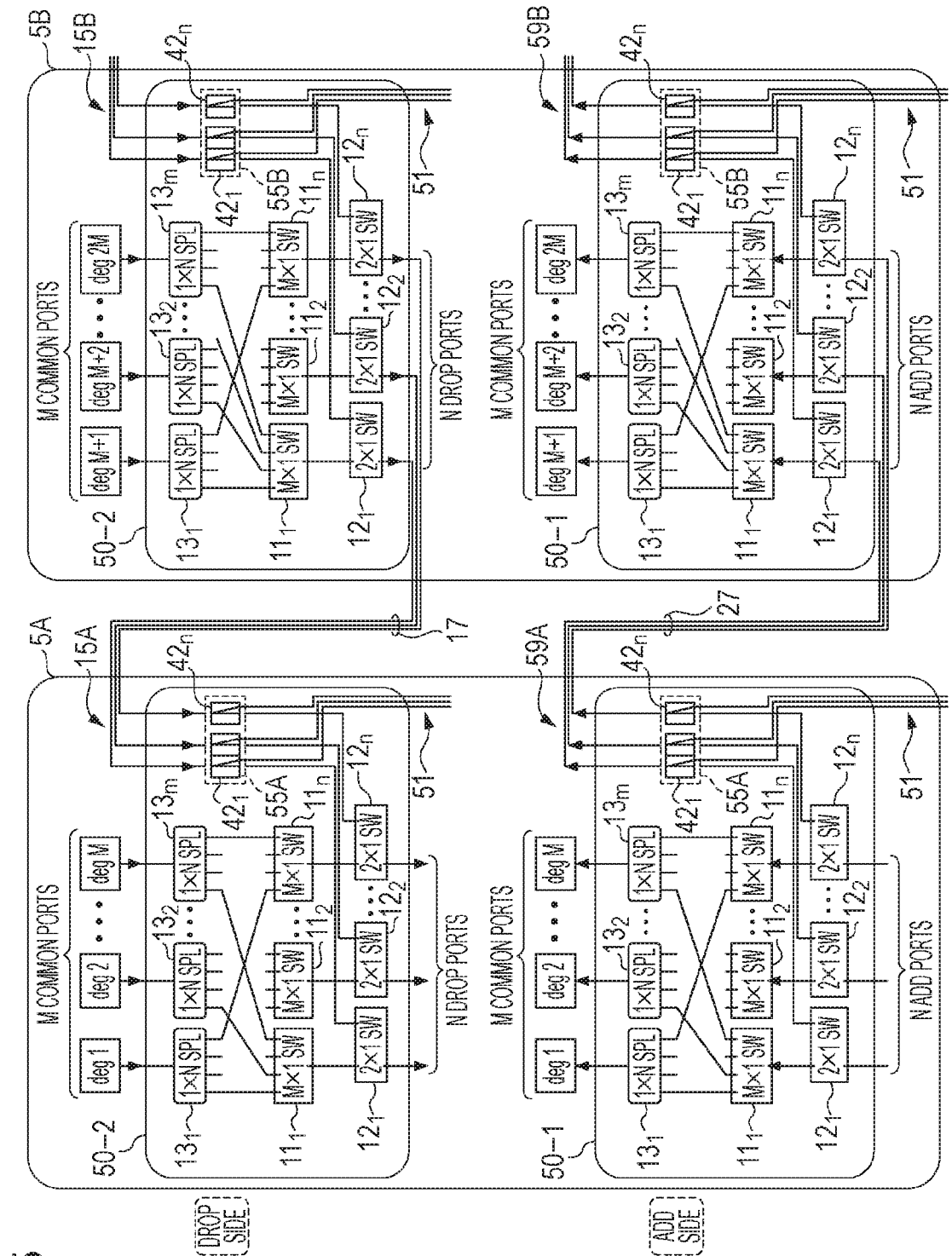
FIG. 15 illustrates a modification of the third embodiment.

FIG. 15 illustrates a modification of the third embodiment. In this modification, the TAP circuit 55A in which 2×1 optical switches 42 are used is placed in the drop side as well. An additional MCS module 5B is connected to an MCS module 5A in operation for path expansion. In this example, the MCS modules 5A and 5B have the same structure. Therefore, the following description will focus on the MCS module 5A.

The MCS module 5A has an MCS 50-1 on the add side and an MCS 50-2 on the drop side. When connections are to be checked on the drop side, the setting of each 2×1 optical switch 42 is switched to the verify port 51 at the TAP circuit 55A in the MCS 50-2 in the MCS module 5A, which is a first MCS module. At the TAP circuit 55B in the MCS 50-2 in the MCS module 5B, which is a second MCS module, the setting of each 2×1 optical switch 42 is switched to the corresponding 2×1 optical switch 12.

Test signals are input from the upgrade port 15B in the second MCS module 5B, pass through drop ports in the MCS module 5B, are led to the upgrade port 15A in the first MCS module 5A through the optical cable 17, and are input to the TAP circuit 55A. Since the setting of each 2×1 optical switch 42 in the TAP circuit 55A has been switched to the verify port 51, when an output optical signal is monitored at the verify port 51, connections between the MCS modules 5A and 5B on the drop side are checked. The structure and connection check on the add side are the same as in FIG. 14.

In the structure in FIG. 15, the MCS 50-1 and MCS 50-2, which have the same structure, can be used on the add side and drop side in each MCS module 5, the manufacturing process is simplified.

Fourth Embodiment

Figure 16:
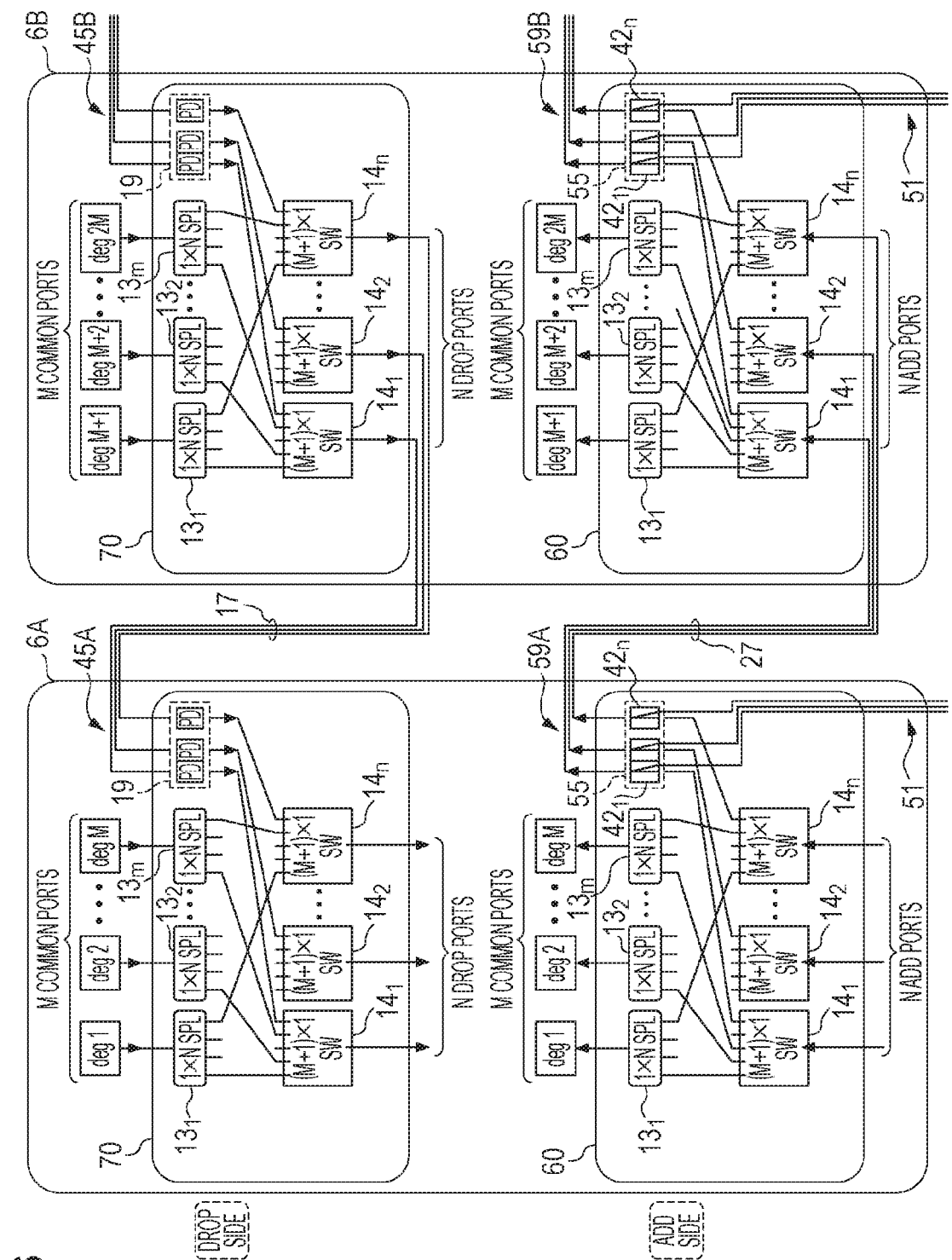
FIG. 16 illustrates a path expansion structure in which MCS modules in a fourth embodiment are used.

FIG. 16 illustrates a path expansion structure in which MCS modules in a fourth embodiment are used. In the fourth embodiment, (M+1)×1 optical switches 14 are used for path expansion, instead of using a combination of M×1 optical switches and 2×2 optical switches or 2×1 optical switches.

In this example, an MCS module 6A is a module in operation and an MCS module 6B is an additionally connected module. The MCS modules 6A and 6B have the same structure. Therefore, the following description will focus on the MCS module 6A.

The MCS module 6A has an MCS 60 on the add side and an MCS 70 on the drop side. The MCS 60 has n (M+1)×1 optical switches 14 and m 1×N optical couplers 13, a TAP circuit 55, and the verify port 51. M output ports of each (M+1)×1 optical switch 14 are connected to the 1×N optical couplers 13, and an M+1st output port is connected to the upgrade port 59A. The TAP circuit 55 is inserted between the upgrade port 59A and the M+1st output port of each (M+1)×1 optical switch 14. The TAP circuit 55 has n 2×1 optical switches 42. The first input port of each 2×1 optical switch 42 is connected to the M+1st output port of the corresponding (M+1)×1 optical switch 14, and the second input port is connected to the verify port 51. The output port of the 2×1 optical switch 42 is connected to the upgrade port 59A.

The MCS 70 on the drop side has n (M+1)×1 optical switches 14, m 1×N optical couplers 13, and the TAP circuit 19. M input ports of each (M+1)×1 optical switch 14 are connected to the 1×N optical couplers 13, and an M+1st input port is connected the upgrade port 45A. The TAP circuit 19 is inserted between the upgrade port 45A and the M+1st input port of each (M+1)×1 optical switch 14. The TAP circuit 19 has n monitor photodetectors (PDs).

When paths are to be added, the MCS module 6B, which is a second MCS module, is connected to the MCS module 6A, which is a first MCS module, through the optical cables 17 and 27. When connections between them are to be checked, the settings of the 2×1 optical switches 42 in the TAP circuit 55 in the first MCS module 6A are switched to the verify port 51 on the add side and the settings of the 2×1 optical switch 42 in the second MCS module 6B are switched to the (M+1)×1 optical switches 14. When test signals are input from the verify port 51 in the first MCS module 6A and are monitored at the upgrade port 59B in the second MCS module 6B, connections between the first MCS module 6A and the second MCS module 6B can be checked.

On the drop side, test signals are input from the upgrade port 45B in the second MCS module 6B and are monitored at the TAP circuit 19 in the first MCS module 6A.

In this structure, connections can be checked on both the add side and the drop side before path expansion, without affecting the operation of the first MCS module 6A.

Figure 17:
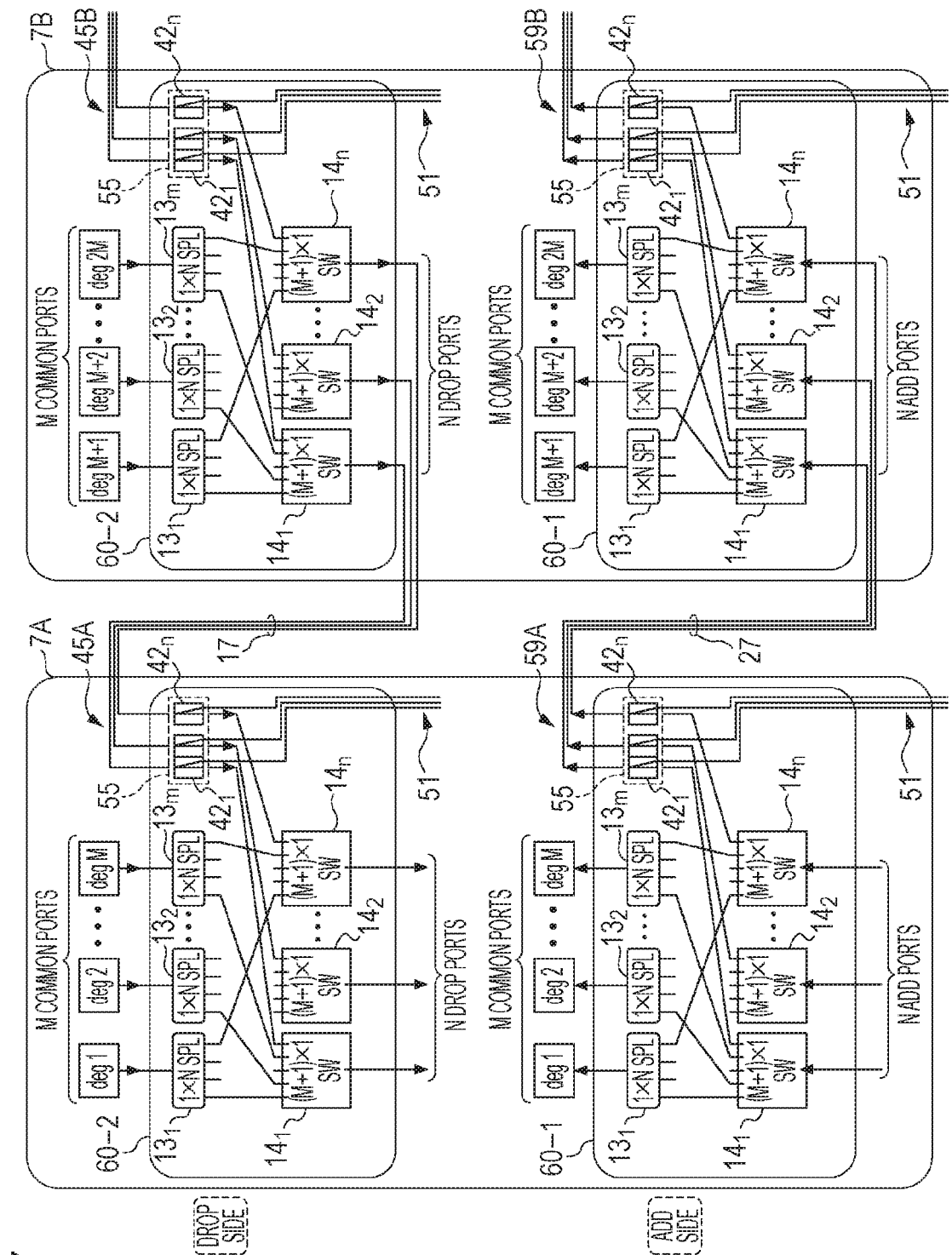
FIG. 17 illustrates a modification of the fourth embodiment.

FIG. 17 illustrates a modification of the fourth embodiment. In this modification, the TAP circuit 55 in which 2×1 optical switches 42 are used is employed instead of the TAP circuit 19 in which PDs are used. In this example, an MCS module 7A is a module in operation and an MCS module 7B is an additionally connected module. The MCS module 7A and MCS module 7B have the same structure. Therefore, the following description will focus on the MCS module 7A.

The MCS module 7A has an MCS 60-1 on the add side and an MCS 60-2 on the drop side. The MCS 60-1 has the same structure as the MCS 60 in FIG. 16, and the method of checking connections during path expansion is also the same.

The MCS 60-2 has the same structure as the MCS 60-1. The MCS module 7B, which is a second MCS module, is connected to the MCS module 7A, which is a first MCS module, through the optical cables 17 and 27, after which connections between them are checked. On the drop side, the output port setting of each 2×1 optical switch 42 in the second MCS module 7B is switched to the corresponding (M+1)×1 optical switch 14 and the output port setting of each 2×1 optical switch 42 in the first MCS module 7A is switched to the verify port 51. Test signals are input from the upgrade port 45B in the second MCS module 7B and are monitored at the verify port 51 on the drop side in the first MCS module 7A.

In this structure as well, connections can be checked on both the add side and the drop side, without affecting the operation of the first MCS module 7A during path expansion.

Optical Relay Apparatus

Figure 18:
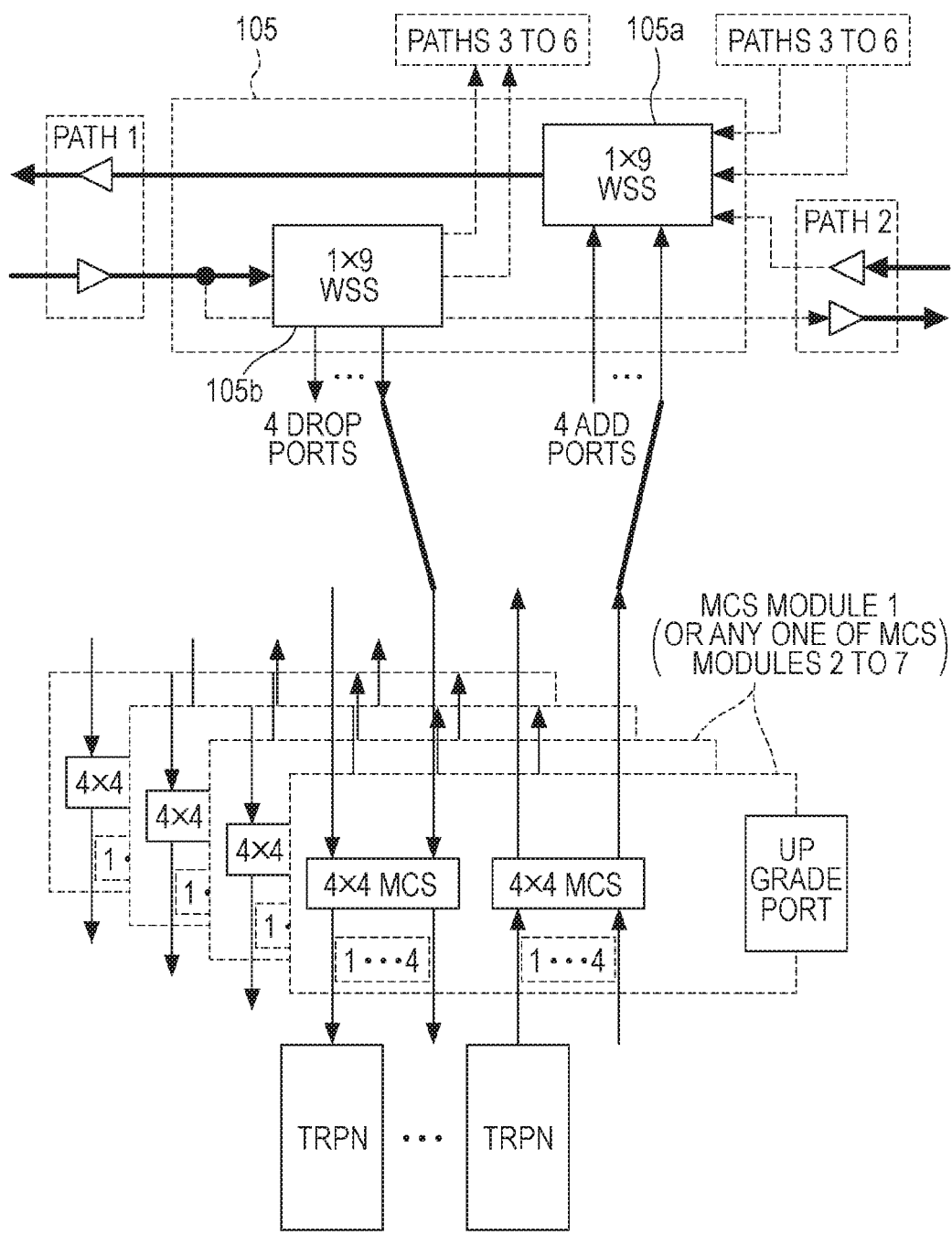
FIG. 18 illustrates an example of the structure of a ROADM in which MCS modules in an embodiment are used.

FIG. 18 illustrates an example of the structure of a ROADM 80A in which MCS modules in an embodiment and 1×9 WSSs 105a and 105b are combined. The MCS modules may be any one of the MCS modules 1 to 7 described in the first to fourth embodiments and their modifications.

As an example, the MCS module 1 (or any one of MCS modules 2 to 7) is a module that uses 4×4 MCSs having an upgrade function. For each installed transponder (TRPN), adding and dropping are possible by using colorless, directionless, and contentionless (CDC) functions adaptable to up to four paths.

The ROADM 80A is used on, for example, a ring network having six paths 1 to 6. For optical signals transmitted from a path 1 on the drop side, the 1×9 WSSs 105b on the drop side selects the four drop ports of the MCS module 1 (or any one of MCS modules 2 to 7) and five paths 2 to 6 (or a network). Another WSS, which is not illustrated in FIG. 18 to simplify it, selects optical signals sent from the add ports of the MCS module 1 (or any one of MCS modules 2 to 7) toward directions other than the path 1.

On the add side, optical signals destined for the path 1 are selected by the 1×9 WSSs 105a. For example, four inputs from the add ports of the MCS module 1 (or any one of MCS modules 2 to 7) and optical signals from the five paths 2 to 6 are selected. Another WSS, which is not illustrated in FIG. 18 to simplify it, selects signals to be dropped from the paths 2 to 6 to the MCS module 1 (or any one of MCS modules 2 to 7).

Figure 19:
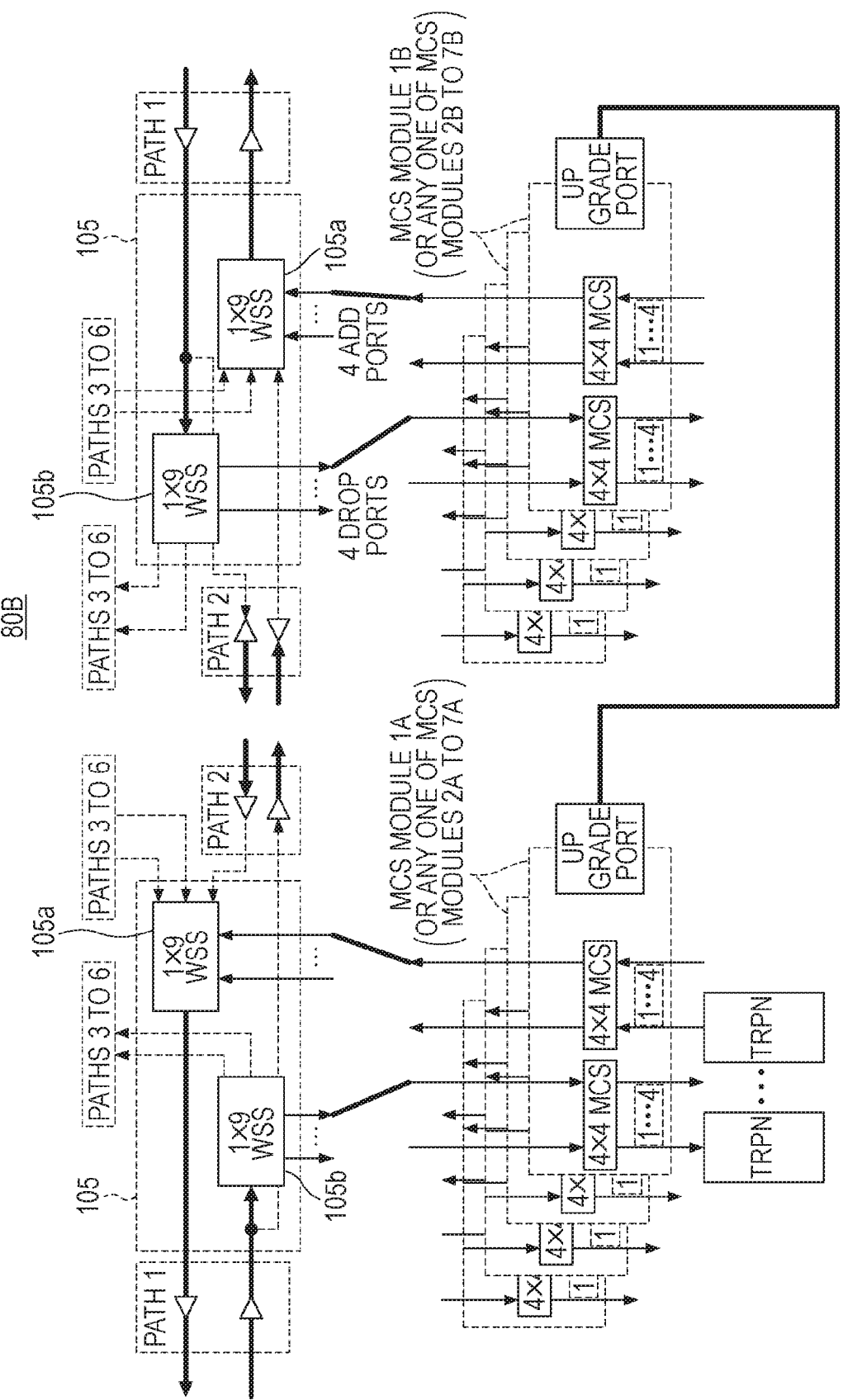
FIG. 19 illustrates a ROADM structure, in which path expansion has been carried out.

FIG. 19 illustrates a ROADM 80B, in which path expansion has been carried out, indicating an example of expansion in a case in which adding and dropping adaptable to up to eight paths are desirable to increase network flexibility in the MCS module 1 (or any one of MCS modules 2 to 7). To increase the number of paths from 4 to 8, an upgrade port is used to connect a new MCS module 1B to the MCS module 1A in operation. In a case as well in which any one of MCS modules 2A to 7A is used, the corresponding one of MCS modules 2B to 7B having the same structure as the MCS modules 2A to 7A is additionally connected.

Although, in the examples of the structures in FIGS. 18 and 19, 4×4 MCSs and 1×9 WSSs have been used, M×N MCSs and 1×K WSSs (M, N, and K are an arbitrary integer) may be used instead.

FIG. 20 illustrates a flowchart indicating a path expansion method in an embodiment. First, a new MCS module (second MCS module, for example) to be added to an MCS module in operation (first MCS module, for example) is prepared (S11). The first and second MCS modules may have any one of the structures described in the first to fourth embodiments.

The first MCS module and second MCS module are interconnected with optical fibers such as in the form of an optical cable (S12). Settings for connection check are made at each MCS module on a demand basis (S13). If, for example, the TAP circuit 55 in which 2×1 optical switches 42 are used is placed for connection check, it is checked whether the settings of the 2×1 optical switches 42 in the first MCS module are switched to the verify port 51 and the settings of the 2×1 optical switches 42 in the second MCS modules are switched to ports other than the verify port 51.

After the settings have been checked, optical signals (test signals) for connection monitoring are input (S14), after which whether the test signals have been monitored is checked (S15). If, for example, test signals at a prescribed level or higher are detected (the result in S15 is Yes), the processing is terminated, assuming that the test signals have been confirmed. If the test signal fails to be confirmed (the result in S15 is No), the connection states of the optical fibers and optical connectors, for example, are checked (S16), and test signals are input and checked again (S14 and S15). When S14 and S15 are repeated until the test signals are confirmed, reliable connection of the additional MCS module is assured and it is suppressed that an optical signal is lost or is sent in an incorrect direction. Connection checks on the add site and drop side may be performed one at a time or simultaneously.

Upon completion of connection confirmation, the second MCS module is operated. Signals that have been sent from the transponders to M paths can now be sent to 2×M paths. It also becomes possible for the transponders to receive any optical signals from 2×M paths.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A path expansion method of a system including a first optical switch module and a second optical switch module, wherein both the first optical switch module and the second optical switch module includes N first input ports to which an optical signal is input, M first output ports from which an optical signal is output, an M×N switch configured to include N second input ports and M second output ports, and to set an optical path between the N second input ports and the M second output ports, the M second output ports coupling with the M first output ports, respectively, a test signal input port to which a test signal is capable of being externally input, an expansion port from which one of the test signal and the optical signal from any one of the N first input ports is output, and an optical switch configured to selectively connect at least one of the test signal and the optical signal from any one of the N first input ports to at least one of the expansion port and any one of the N second input ports, the path expansion method comprising:

connecting the expansion port of the first optical switch module to the test signal input port of the second optical switch module;

switching a setting of the optical switch of the first optical switch module so as to connect the test signal to the expansion port;

monitoring, at the second optical switch module, the test signal input from the test signal input port of the first optical switch module, checking a connection between the first optical switch module and the second optical switch module, based on a result of the monitoring; and switching the setting of the optical switch of the first optical switch module so as to connect the optical signal from any one of the N first input ports to the expansion port, wherein both N and M are natural numbers.

2. The path expansion method according to claim 1, wherein the optical switch is a 2×2 optical switch arranged between the N first input ports and the M×N switch, wherein a third input port of the 2×2 optical switch is coupled with any one of the N first input ports, a fourth input port of the 2×2 optical switch is coupled with the test signal input port, a third output port of the 2×2 optical switch is coupled with any one of the N second input ports, and a fourth output port of the 2×2 optical switch is coupled with the expansion port, wherein, when the test signal is input to the test signal input port, the third input port is switched to the third output port and the fourth input port is switched to the fourth output port, and wherein, when the optical signal from any one of the N first input ports is transmitted to the expansion port, the third input port is switched to the fourth output port and the fourth input port is switched to the third output port.

* * * * *